United States Patent
Luo et al.

(10) Patent No.: US 11,968,633 B2
(45) Date of Patent: Apr. 23, 2024

(54) RELAY COMMUNICATION METHOD AND APPARATUS

(71) Applicant: HUAWEI TECHNOLOGIES CO., LTD., Guangdong (CN)

(72) Inventors: Haiyan Luo, Shanghai (CN); Mingzeng Dai, Guangdong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 17/327,007

(22) Filed: May 21, 2021

(65) Prior Publication Data
US 2021/0282098 A1  Sep. 9, 2021

Related U.S. Application Data

(63) Continuation of application No. PCT/CN2019/113120, filed on Oct. 24, 2019.

(30) Foreign Application Priority Data

Nov. 22, 2018  (CN) .................... 201811401914.3

(51) Int. Cl.
*H04W 52/46* (2009.01)
*H04W 72/044* (2023.01)
(Continued)

(52) U.S. Cl.
CPC ....... *H04W 52/46* (2013.01); *H04W 72/0473* (2013.01); *H04W 72/21* (2023.01); *H04W 72/51* (2023.01); *H04W 76/11* (2018.02)

(58) Field of Classification Search
None
See application file for complete search history.

(56) References Cited

U.S. PATENT DOCUMENTS

2013/0079013 A1    3/2013  Shi
2015/0043490 A1*   2/2015  Wu ................. H04W 76/38
                                                      370/329
(Continued)

FOREIGN PATENT DOCUMENTS

CN     101453745 A    6/2009
CN     105657643 A    6/2016
(Continued)

OTHER PUBLICATIONS

ZTE, Service continuity for the Evolved Prose Remote UE. 3GPP TSG-RAN WG2 Meeting#98, Hangzhou, China, May 15-19, 2017, R2-1704631, 5 pages.
(Continued)

*Primary Examiner* — Srinivasa R Reddivalam

(57) ABSTRACT

The technology of this application relates to a relay communication method. After receiving first information sent by a first terminal device, a first radio access network device may determine, based on the first information, a second terminal device that provides, in a target cell, a relay service for the first terminal device, where the first information is used to indicate that the first terminal device is a terminal device with limited uplink power. The first radio access network device sends second information to a second radio access network device, where the second information is used to indicate the second terminal device that provides, in the target cell, the relay service for the first terminal device.

19 Claims, 12 Drawing Sheets

(51) Int. Cl.
*H04W 72/21* (2023.01)
*H04W 72/51* (2023.01)
*H04W 76/11* (2018.01)

(56) References Cited

U.S. PATENT DOCUMENTS

| | | | |
|---|---|---|---|
| 2017/0311344 | A1 | 10/2017 | Lee et al. |
| 2017/0367018 | A1* | 12/2017 | Huang ............... H04W 36/04 |
| 2018/0167986 | A1* | 6/2018 | Lin ..................... H04W 8/26 |
| 2019/0313315 | A1* | 10/2019 | Xu ..................... H04W 36/30 |
| 2019/0357101 | A1* | 11/2019 | Stojanovski ........ H04W 4/50 |

FOREIGN PATENT DOCUMENTS

| | | |
|---|---|---|
| CN | 106937340 A | 7/2017 |
| CN | 107889080 A | 4/2018 |
| CN | 108024295 A | 5/2018 |
| CN | 108307536 A | 7/2018 |
| CN | 108605253 A | 9/2018 |
| CN | 108605258 A | 9/2018 |
| CN | 108617024 A | 10/2018 |
| CN | 108684218 A | 10/2018 |
| WO | 2014059663 A1 | 4/2014 |
| WO | 2015095586 A1 | 6/2015 |
| WO | 2018098708 A1 | 6/2018 |
| WO | 2018202797 A1 | 11/2018 |

OTHER PUBLICATIONS

ZTE, TP to update solution 2a-2 in feD2D. 3GPP TSG-RAN WG3 Meeting#96, Hangzhou, China, May 15-19, 2017, R3-171656, 8 pages.

European Search Report dated Feb. 9, 2022 for EP Application No. 19886792.1, 12 pages.

ZTE, TP for Relay to Relay Path Switch in feD2D. 3GPP TSG-RAN WG3 Meeting #96, Hangzhou, China, May 15-19, 2017, R3-171655, 10 pages.

Intel Corporation, Discussion on FeD2D scenarios. 3GPP TSG RAN WG2 Meeting #93bis, Dubrovnik, Croatia, Apr. 11-15, 2016, R2-162720, 7 pages.

3GPP TR 36.746 V15.1.1 (Apr. 2018), 3rd Generation Partnership Project; Technical Specification Group Radio Access Network; Study on further enhancements to LTE Device to Device (D2D); User Equipment (UE) to network relays for Internet of Things (IoT) and wearables;(Release 15), 55 pages.

Huawei, TP for FeD2D Wearable Solutions. 3GPP TSG-RAN3 Meeting #96, Hangzhou, China, May 15-19, 2017, R3-171958, 6 pages.

International Search Report and Written Opinion issued in PCT/2019/113120, dated Feb. 6, 2020, 11 pages.

Office Action issued in CN 201811401914.3 dated Mar. 10, 2021, 14 pages.

Office Action issued in CN 201811401914.3 dated Sep. 22, 2020, 13 pages.

* cited by examiner

RELAY COMMUNICATION METHOD AND APPARATUS

CROSS-REFERENCE TO RELATED APPLICATIONS

This application is a continuation of International Application No. PCT/CN2019/113120, filed on Oct. 24, 2019, which claims priority to Chinese Patent Application No. 201811401914.3, filed on Nov. 22, 2018. The disclosures of the aforementioned applications are hereby incorporated by reference in their entireties.

TECHNICAL FIELD

Embodiments of this application relate to the communication field, and in particular, to a relay communication method and apparatus.

BACKGROUND

In a fifth generation (5G) mobile communication technology, a remote device with limited power may communicate with a radio access network device through a relay device, to reduce power consumption of the remote device. The relay device herein may be a terminal device, and the terminal device communicates with the remote device through a sidelink. The 3rd generation partnership project (3GPP) discusses an issue of unidirectional relay and bidirectional relay. The bidirectional relay means that both uplink data and downlink data between a remote device and a radio access network device are forwarded through a relay device. The unidirectional relay means that uplink data between a remote device and a radio access network device is forwarded through a relay device, and downlink data between the radio access network device and the remote device does not need to be forwarded through the relay device. When a remote device moves from a coverage area of a source radio access network device to a coverage area of a target access network device, how the remote device performs uplink data communication with the target radio access network device through a relay device is a problem to be resolved.

SUMMARY

Embodiments of this application provide a relay communication method and apparatus, to resolve a problem of how a remote device performs uplink communication with a target radio access network device through a relay device when the remote device moves to a coverage area of a target cell in a unidirectional relay scenario.

To achieve the foregoing objective, the following technical solutions are used in the embodiments of this application.

According to a first aspect, an embodiment of this application provides a relay communication method. The method may be applied to a first radio access network device, or the method may be applied to a communication apparatus that can support the first radio access network device in implementing the method. For example, the communication apparatus includes a chip system. The method includes: after receiving first information sent by a first terminal device, the first radio access network device sends second information to a second radio access network device, where the first information is used to indicate that the first terminal device is a terminal device with limited uplink power, the second information is used to indicate a second terminal device that provides, in a target cell, a relay service for the first terminal device, the second radio access network device is a radio access network device to which the target cell belongs, and the first terminal device needs to be connected to the target cell.

According to the relay communication method provided in this embodiment of this application, when the first terminal device needs to be connected to the target cell of the second radio access network device, the first radio access network device may determine, based on the indication information indicating that the first terminal device is a terminal device with limited uplink power, that both the first terminal device and the second terminal device are to be connected to the target cell and the second terminal device provides, in the target cell, the relay service for the first terminal device. In this way, a remote device can still perform uplink communication with a target radio access network device through a relay device.

With reference to the first aspect, in a first possible implementation, after the receiving, by a first radio access network device, first information sent by a first terminal device, the method further includes: the first radio access network device may determine, based on the first information according to a protocol specification, the second terminal device that provides, in the target cell, the relay service for the first terminal device. Therefore, the first radio access network device can determine, in an implicit indication manner, the second terminal device that provides, in the target cell, the relay service for the first terminal device, and that both the first terminal device and the second terminal device are to be connected to the target cell, so that signaling overheads can be effectively reduced.

With reference to the first aspect, in a second possible implementation, the method further includes: the first radio access network device may further receive third information sent by the first terminal device, where the third information is used to indicate the second terminal device that provides, in the target cell, the relay service for the first terminal device. Therefore, the first radio access network device can determine, in an explicit indication manner, the second terminal device that provides, in the target cell, the relay service for the first terminal device, and that both the first terminal device and the second terminal device are to be connected to the target cell.

With reference to the first aspect or the foregoing possible implementations, in a third possible implementation, the second information includes an identifier of the first terminal device and an identifier of the second terminal device, or the second information includes an identifier of the second terminal device. Therefore, the second radio access network device determines that both the first terminal device and the second terminal device are to be connected to the target cell and the second terminal device provides, in the target cell, the relay service for the first terminal device.

Optionally, the second information may further include fourth information, and the fourth information is used to indicate that the second terminal device provides, in the target cell, the relay service for the first terminal device. Therefore, the first radio access network device indicates, to the second radio access network device in an explicit indication manner, that the second terminal device provides, in the target cell, the relay service for the first terminal device and both the first terminal device and the second terminal device are to be connected to the target cell.

With reference to the first aspect and the foregoing possible implementations, in a fifth possible implementation, after the sending, by the first radio access network device, second information to a second radio access network device, the method further includes: the first radio access network device may further receive fifth information and sixth information sent by the second radio access network device; and send the fifth information to the first terminal device, and send the sixth information to the second terminal device, where the fifth information includes a target cell identifier and a first cell radio network temporary identifier (C-RNTI) allocated to the first terminal device, and the sixth information includes the target cell identifier, a second C-RNTI allocated to the second terminal device, and a random access resource. Therefore, the first terminal device and the second terminal device separately establish a connection to the second radio access network device based on the fifth information and the sixth information.

It should be noted that the fifth information and the sixth information may be encapsulated in a same interface message sent by the second radio access network device to the first radio access network device. In this way, the signaling overhead can be reduced.

According to a second aspect, an embodiment of this application provides a relay communication method. The method may be applied to a first terminal device, or the method may be applied to a communication apparatus that can support the first terminal device in implementing the method. For example, the communication apparatus includes a chip system. The method includes: the first terminal device sends first information to a first radio access network device, where the first information is used to indicate that the first terminal device is a terminal device with limited uplink power.

According to the relay communication method provided in this embodiment of this application, when the first terminal device needs to be connected to a target cell of a second radio access network device, the first terminal device may report, to the first radio access network device, the indication information indicating that the first terminal device is a terminal device with limited uplink power, so that the first radio access network device can determine, based on the indication information indicating that the first terminal device is a terminal device with limited uplink power, that both the first terminal device and the second terminal device are to be connected to the target cell and the second terminal device provides, in the target cell, a relay service for the first terminal device. In this way, a remote device can still perform uplink communication with a target radio access network device through a relay device.

With reference to the second aspect, in a first possible implementation, the first terminal device determines second information based on the first information, and sends the second information to the first radio access network device. The second information is used to indicate the second terminal device that provides, in the target cell, the relay service for the first terminal device. Therefore, the first radio access network device can determine, in an explicit indication manner, the second terminal device that provides, in the target cell, the relay service for the first terminal device, and that both the first terminal device and the second terminal device are to be connected to the target cell.

With reference to the second aspect and the foregoing possible implementation, in a second possible implementation, the method further includes: the first terminal device receives third information, and communicates with the target cell of the second radio access network device through the second terminal device based on the third information, where the third information includes a target cell identifier and a first C-RNTI allocated to the first terminal device. Therefore, the first terminal device can establish a connection to the second radio access network device based on the third information.

According to a third aspect, an embodiment of this application provides a relay communication method. The method may be applied to a second radio access network device, or the method may be applied to a communication apparatus that can support the second radio access network device in implementing the method. For example, the communication apparatus includes a chip system. The method includes: the second radio access network device receives first information sent by a first radio access network device, where the first information is used to indicate a second terminal device that provides, in a target cell, a relay service for a first terminal device.

According to the relay communication method provided in this embodiment of this application, when the first terminal device needs to be connected to the target cell of the second radio access network device, the second radio access network device determines, based on the first information sent by the first radio access network device, that a terminal device that provides, in the target cell, the relay service for the first terminal device is the second terminal device, that is, both the first terminal device and the second terminal device are to be connected to the target cell. Therefore, the second radio access network device can allocate, to the first terminal device and the second terminal device, a resource required for connecting both the first terminal device and the second terminal device to the target cell. The second terminal device provides, in the target cell, the relay service for the first terminal device. In this way, a remote device can still perform uplink communication with a target radio access network device through a relay device.

For example, the first information may include an identifier of the first terminal device and an identifier of the second terminal device; or the first information may include an identifier of the second terminal device. Therefore, the second radio access network device determines that the first information is information about the first terminal device and the second terminal device, and both the first terminal device and the second terminal device are to be connected to the target cell. In addition, the second radio access network device may determine, in an implicit indication manner in which the first information includes the identifier of the terminal device, the second terminal device that provides, in the target cell, the relay service for the first terminal device, and that both the first terminal device and the second terminal device are to be connected to the target cell, so that signaling overhead can be effectively reduced.

With reference to the third aspect, in a possible implementation, after the receiving, by a second radio access network device, first information sent by a first radio access network device, the method further includes: the second radio access network device sends second information and third information to the first radio access network device, where the second information includes a target cell identifier and a first C-RNTI allocated to the first terminal device, and the third information includes the target cell identifier, a second C-RNTI allocated to the second terminal device, and a random access resource. Therefore, the first radio access network device transmits the second information to the first terminal device, and transmits the third information to the second terminal device, so that the first terminal device and the second terminal device separately establish a connection to the second radio access network device based on the second information and the third information.

According to a fourth aspect, an embodiment of this application provides a relay communication method. The method may be applied to a first radio access network device, or the method may be applied to a communication apparatus that can support the first radio access network device in implementing the method. For example, the communication apparatus includes a chip system. The method includes: after receiving first information sent by a first terminal device, the first radio access network device sends second information to a second radio access network device, where the first information is used to indicate that the first terminal device is a terminal device with limited uplink power, the second information is used to indicate that the second radio access network device does not need to allocate, in a target cell, a random access resource to the first terminal device, the second radio access network device is a radio access network device to which the target cell belongs, and the first terminal device needs to be connected to the target cell.

According to the relay communication method provided in this embodiment of this application, when the first terminal device needs to be connected to the target cell of the second radio access network device, the first radio access network device may determine, based on the indication information indicating that the first terminal device is a terminal device with limited uplink power, whether an uplink from the first terminal device to the first radio access network device is maintained. For example, the first terminal device may maintain, through a second terminal device, an uplink connection to the first radio access network device, and the first radio access network device transmits uplink data of the first terminal device to the second radio access network device. In this way, a remote device can still perform uplink communication with a target radio access network device through a relay device.

With reference to the fourth aspect, in a first possible implementation, after the receiving, by a first radio access network device, first information sent by a first terminal device, the method further includes: the first radio access network device may determine, based on the first information, whether the uplink from the first terminal device to the first radio access network device is maintained. Therefore, the first radio access network device can determine, in an implicit indication manner, whether the uplink from the first terminal device to the first radio access network device is maintained, so that signaling overhead can be effectively reduced.

With reference to the fourth aspect, in a second possible implementation, the method further includes: when the first terminal device needs to be connected to the target cell of the second radio access network device, the first radio access network device receives third information sent by the first terminal device, where the third information is used to indicate whether the uplink from the first terminal device to the first radio access network device is maintained. Therefore, the first radio access network device can determine, in an explicit indication manner, whether the uplink from the first terminal device to the first radio access network device is maintained.

With reference to the fourth aspect or the foregoing possible implementations, in a third possible implementation, after the receiving, by a first radio access network device, first information sent by a first terminal device, the method further includes: the first radio access network device sends an identifier of the first terminal device to the second radio access network device. Therefore, the second radio access network device determines that the second information is information about the first terminal device.

With reference to the fourth aspect and the foregoing possible implementations, in a fourth possible implementation, after the sending, by the first radio access network device, second information to a second radio access network device, the method further includes: the first radio access network device receives fourth information sent by the second radio access network device; and sends the fourth information to the first terminal device, where the fourth information includes a target cell identifier and a first C-RNTI allocated to the first terminal device. Therefore, the first terminal device establishes a connection to the second radio access network device based on the fourth information.

According to a fifth aspect, an embodiment of this application provides a relay communication method. The method may be applied to a first terminal device, or the method may be applied to a communication apparatus that can support the first terminal device in implementing the method. For example, the communication apparatus includes a chip system. The method includes: The first terminal device sends first information to a first radio access network device, where the first information is used to indicate that the first terminal device is a terminal device with limited uplink power.

According to the relay communication method provided in this embodiment of this application, when the first terminal device needs to be connected to a target cell of a second radio access network device, the first terminal device may report, to the first radio access network device, the indication information indicating that the first terminal device is a terminal device with limited uplink power, so that the first radio access network device can determine, based on the indication information indicating that the first terminal device is a terminal device with limited uplink power, whether an uplink from the first terminal device to the first radio access network device is maintained. For example, the first terminal device may maintain, through a second terminal device, an uplink connection to the first radio access network device, and the first radio access network device transmits uplink data of the first terminal device to the second radio access network device. In this way, a remote device can still perform uplink communication with a target radio access network device through a relay device.

With reference to the fifth aspect, in a first possible implementation, the first terminal device determines second information based on the first information, and sends the second information to the first radio access network device. The second information is used to indicate whether the uplink from the first terminal device to the first radio access network device is maintained. Therefore, the first radio access network device can determine, in an explicit indication manner, whether the uplink from the first terminal device to the first radio access network device is maintained.

With reference to the fifth aspect and the foregoing possible implementation, in a second possible implementation, the method further includes: the first terminal device receives third information, and communicates with the target cell of the second radio access network device through the second terminal device based on the third information, where the third information includes a target cell identifier and a first cell radio network temporary identifier C-RNTI allocated to the first terminal device. Therefore, the first terminal device can establish a connection to the second radio access network device based on the third information.

According to a sixth aspect, an embodiment of this application provides a relay communication method. The method may be applied to a second radio access network device, or the method may be applied to a communication apparatus that can support the second radio access network device in implementing the method. For example, the communication apparatus includes a chip system. The method includes: the second radio access network device receives first information sent by a first radio access network device, where the first information is used to indicate that the second radio access network device does not need to allocate, in a target cell, a random access resource to a first terminal device.

According to the relay communication method provided in this embodiment of this application, when the first terminal device needs to be connected to the target cell of the second radio access network device, the second radio access network device determines, based on the first information sent by the first radio access network device, whether an uplink from the first terminal device to the first radio access network device is maintained. For example, the first terminal device may maintain, through a second terminal device, an uplink connection to the first radio access network device, and the first radio access network device transmits uplink data of the first terminal device to the second radio access network device. Therefore, the second radio access network device can allocate, to the first terminal device, a resource required for connecting the first terminal device to the target cell. The second terminal device provides, in the target cell, a relay service for the first terminal device. In this way, a remote device can still perform uplink communication with a target radio access network device through a relay device.

With reference to the sixth aspect, in a first possible implementation, the method further includes: the second radio access network device receives an identifier of the first terminal device sent by the first radio access network device. Therefore, the second radio access network device determines that the first information is information about the first terminal device.

With reference to the sixth aspect, in a second possible implementation, after the receiving, by a second radio access network device, first information sent by a first radio access network device, the method further includes: the second radio access network device sends second information to the first radio access network device, where the second information includes a target cell identifier and a first C-RNTI allocated to the first terminal device. Therefore, the first radio access network device transmits the second information to the first terminal device, so that the first terminal device establishes a connection to the second radio access network device.

According to a seventh aspect, an embodiment of this application provides a relay communication method. The method may be applied to a second radio access network device, or the method may be applied to a communication apparatus that can support the second radio access network device in implementing the method. For example, the communication apparatus includes a chip system. The method includes: the second radio access network device receives an adaptation layer header equivalent to that of a second terminal device and a first payload equivalent to that of a first terminal device, where the adaptation layer header includes an identifier of the first terminal device and an identifier of a data radio bearer that is of the first terminal device and that is equivalent to that of the second radio access network device, or the adaptation layer header includes an identifier of the first terminal device and an identifier of a logical channel between the first terminal device and the second terminal device; and the second radio access network device determines, based on the identifier of the first terminal device and the identifier of the data radio bearer that is of the first terminal device and that is equivalent to that of the second radio access network device, a packet data convergence protocol (PDCP) layer entity that is of the second radio access network device and that corresponds to the identifier of the data radio bearer of the first terminal device; or determines, based on the identifier of the first terminal device and the identifier of the logical channel between the first terminal device and the second terminal device, a PDCP layer entity that is of the second radio access network device and that corresponds to the identifier of the logical channel of the first terminal device. Therefore, the second radio access network device can determine a terminal device that sends received data and a data radio bearer (DRB) through which the received data is sent.

It should be noted that the target cell identifier in the foregoing embodiments may be determined by the first radio access network device, or may be determined by the second radio access network device.

For example, in a handover scenario, the target cell may be determined by a source base station. It is assumed that the source base station is the first radio access network device, and a target base station is the second radio access network device. A handover request message sent by the first radio access network device to the second radio access network device may carry the target cell identifier.

In a scenario in which a secondary base station is added, one method is that a master base station sends a measurement report to the secondary base station, and the secondary base station selects a cell from cells included in the measurement report as a primary cell (PSCell), namely, the primary cell served by the secondary base station, and may select another individual cell as a secondary cell (SCell), namely, the secondary cell served by the secondary base station. Another method is that a master base station determines a secondary cell group (SCG), that is, the master base station determines a group of all cells of the secondary base station, the master base station sends the secondary cell group to the secondary base station, and then the secondary base station selects a cell from the SCG as a primary cell, and another cell may be used as a secondary cell. The master base station herein may be the first radio access network device, and the secondary base station herein may be the second radio access network device.

According to an eighth aspect, an embodiment of this application further provides a communication apparatus, configured to implement the method described in the first aspect or the fourth aspect. The communication apparatus is a first radio access network device or a communication apparatus that supports the first radio access network device in implementing the method described in the first aspect or the fourth aspect. For example, the communication apparatus includes a chip system. For example, the communication apparatus includes a receiving unit and a sending unit. For example, the receiving unit is configured to receive first information sent by a first terminal device, where the first information is used to indicate that the first terminal device is a terminal device with limited uplink power. The sending unit is configured to send second information to a second radio access network device, where the second information is used to indicate a second terminal device that provides, in a target cell, a relay service for the first terminal device, or the second information is used to indicate that the second radio access network device does not need to allocate, in a target cell, a random access resource to the first terminal device. The second radio access network device is a radio access network device to which the target cell belongs, and the first terminal device needs to be connected to the target cell.

Optionally, a specific method is the same as that in the corresponding description in the first aspect or the fourth aspect.

Optionally, the communication apparatus may further include a processing unit, configured to determine, based on the first information, the second terminal device that provides, in the target cell, the relay service for the first terminal device.

According to a ninth aspect, an embodiment of this application further provides a communication apparatus, configured to implement the method described in the second aspect or the fifth aspect. The communication apparatus is a first terminal device and/or a communication apparatus that supports the first terminal device in implementing the method described in the second aspect or the fifth aspect. For example, the communication apparatus includes a chip system. For example, the communication apparatus includes a sending unit. The sending unit is configured to send first information to a first radio access network device, where the first information is used to indicate that the first terminal device is a terminal device with limited uplink power.

Optionally, a specific method is the same as that in the corresponding description in the second aspect or the fifth aspect.

Optionally, the communication apparatus may further include a processing unit. The processing unit is configured to determine second information based on the first information, where the second information is used to indicate a second terminal device that provides, in a target cell, a relay service for the first terminal device, or the second information is used to indicate whether an uplink from the first terminal device to the first radio access network device is maintained. The sending unit is further configured to send the second information to the first radio access network device.

According to a tenth aspect, an embodiment of this application further provides a communication apparatus, configured to implement the methods described in the third aspect, the sixth aspect, and the seventh aspect. The communication apparatus is a second radio access network device and/or a communication apparatus that supports the second radio access network device in implementing the methods described in the third aspect, the sixth aspect, and the seventh aspect. For example, the communication apparatus includes a chip system. For example, the communication apparatus includes a receiving unit. The receiving unit is configured to receive first information sent by a first radio access network device, where the first information is used to indicate that the second radio access network device does not need to allocate, in a target cell, a random access resource to a first terminal device, or the first information is used to indicate a second terminal device that provides, in a target cell, a relay service for a first terminal device.

Optionally, a specific method is the same as that in the corresponding description in the third aspect, the sixth aspect, and the seventh aspect.

Optionally, the communication apparatus may further include a processing unit. The processing unit is configured to: determine, based on an identifier of the first terminal device and an identifier of a data radio bearer that is of the first terminal device and that is equivalent to that of the second radio access network device, a PDCP layer entity that is of the second radio access network device and that corresponds to the identifier of the data radio bearer of the first terminal device; or determine, based on an identifier of the first terminal device and an identifier of a logical channel between the first terminal device and the second terminal device, a PDCP layer entity that is of the second radio access network device and that corresponds to the identifier of the logical channel of the first terminal device.

It should be noted that the function modules in the eighth aspect to the tenth aspect may be implemented by hardware, or may be implemented by hardware executing corresponding software. The hardware or software includes one or more modules corresponding to the function.

For example, a transceiver is configured to complete functions of the receiving unit and the sending unit, a processor is configured to complete functions of the processing unit, and a memory is configured to store program instructions used by the processor to perform the method in the embodiments of this application. The processor, the transceiver, and the memory are connected to each other and communicate with each other through a bus. For details, refer to behavior functions of the first terminal device, the first radio access network device, and the second radio access network device in the method in the first aspect to the method in the sixth aspect.

According to an eleventh aspect, an embodiment of this application further provides a communication apparatus, configured to implement the method described in the first aspect or the fourth aspect. The communication apparatus is a first radio access network device or a communication apparatus that supports the first radio access network device in implementing the method described in the first aspect or the fourth aspect. For example, the communication apparatus includes a chip system. For example, the communication apparatus includes a processor, configured to implement functions of the method described in the first aspect or the fourth aspect. The communication apparatus may further include a memory, configured to store program instructions and data. The memory is coupled to the processor, and the processor may invoke and execute the program instructions stored in the memory, to implement the functions in the method described in the first aspect or the fourth aspect. The communication apparatus may further include a communication interface. The communication interface is used by the communication apparatus to communicate with another device. For example, the communication apparatus is the first radio access network device, and the another device is a first terminal device.

In a possible device, the communication apparatus includes a communication interface. The communication interface is used by the communication apparatus to communicate with another apparatus. For example, the communication interface may be a transceiver. The transceiver is configured to receive first information sent by the first terminal device, where the first information is used to indicate that the first terminal device is a terminal device with limited uplink power. The transceiver is further configured to send second information to a second radio access network device, where the second information is used to indicate a second terminal device that provides, in a target cell, a relay service for the first terminal device, or the second information is used to indicate that the second radio access network device does not need to allocate, in a target cell, a random access resource to the first terminal device. The second radio access network device is a radio access network device to which the target cell belongs, and the first terminal device needs to be connected to the target cell.

Optionally, a specific method is the same as that in the corresponding description in the first aspect or the fourth aspect.

Optionally, the communication apparatus may further include a processor. The processor is configured to determine, based on the first information, the second terminal device that provides, in a target cell, the relay service for the first terminal device.

According to a twelfth aspect, an embodiment of this application further provides a communication apparatus, configured to implement the method described in the second aspect or the fifth aspect. The communication apparatus is a first terminal device and/or a communication apparatus that supports the first terminal device in implementing the method described in the second aspect or the fifth aspect. For example, the communication apparatus includes a chip system. For example, the communication apparatus includes a processor, configured to implement functions of the method described in the second aspect or the fifth aspect. The communication apparatus may further include a memory, configured to store program instructions and data. The memory is coupled to the processor, and the processor may invoke and execute the program instructions stored in the memory, to implement the functions in the method described in the second aspect or the fifth aspect. The communication apparatus may further include a communication interface. The communication interface is used by the communication apparatus to communicate with another device. For example, the communication apparatus is the first terminal device, and the another device is a first radio access network device.

In a possible device, the communication apparatus includes a communication interface. The communication interface is used by the communication apparatus to communicate with another apparatus. For example, the communication interface may be a transceiver. A memory is configured to store program instructions. The transceiver is configured to send first information to the first radio access network device, where the first information is used to indicate that the first terminal device is a terminal device with limited uplink power.

Optionally, the communication apparatus may further include a processor. The processor is configured to determine second information based on the first information, where the second information is used to indicate a second terminal device that provides, in a target cell, a relay service for the first terminal device, or the second information is used to indicate whether an uplink from the first terminal device to the first radio access network device is maintained. The transceiver is further configured to send the second information to the first radio access network device.

Optionally, a specific method is the same as that in the corresponding description in the second aspect or the fifth aspect.

According to a thirteenth aspect, an embodiment of this application further provides a communication apparatus, configured to implement the methods described in the third aspect, the sixth aspect, and the seventh aspect. The communication apparatus is a second radio access network device and/or a communication apparatus that supports the second radio access network device in implementing the methods described in the third aspect, the sixth aspect, and the seventh aspect. For example, the communication apparatus includes a chip system. For example, the communication apparatus includes a processor, configured to implement functions of the methods described in the third aspect, the sixth aspect, and the seventh aspect. The communication apparatus may further include a memory, configured to store program instructions and data. The memory is coupled to the processor, and the processor may invoke and execute the program instructions stored in the memory, to implement the functions in the methods described in the third aspect, the sixth aspect, and the seventh aspect. The communication apparatus may further include a communication interface. The communication interface is used by the communication apparatus to communicate with another device. For example, the communication apparatus is the second radio access network device, and the another device is a first radio access network device. In a possible device, the communication apparatus includes a communication interface.

The communication interface is used by the communication apparatus to communicate with another apparatus. For example, the communication interface may be a transceiver. A memory is configured to store program instructions. The transceiver is configured to receive first information sent by the first radio access network device, where the first information is used to indicate that the second radio access network device does not need to allocate, in a target cell, a random access resource to a first terminal device, or the first information is used to indicate a second terminal device that provides, in a target cell, a relay service for a first terminal device.

Optionally, a specific method is the same as that in the corresponding description in the third aspect, the sixth aspect, and the seventh aspect.

Optionally, the communication apparatus may further include a processor. The processor is configured to: determine, based on an identifier of the first terminal device and an identifier of a data radio bearer that is of the first terminal device and that is equivalent to that of the second radio access network device, a PDCP layer entity that is of the second radio access network device and that corresponds to the identifier of the data radio bearer of the first terminal device; or determine, based on an identifier of the first terminal device and an identifier of a logical channel between the first terminal device and the second terminal device, a PDCP layer entity that is of the second radio access network device and that corresponds to the identifier of the logical channel of the first terminal device.

According to a fourteenth aspect, an embodiment of this application further provides a computer-readable storage medium, including computer software instructions. When the computer software instructions are run in a communication apparatus, the communication apparatus is enabled to perform the method according to any one of the first aspect to the seventh aspect.

According to a fifteenth aspect, an embodiment of this application further provides a computer program product including instructions. When the computer program product runs in a communication apparatus, the communication apparatus is enabled to perform the method according to any one of the first aspect to the seventh aspect.

According to a sixteenth aspect, an embodiment of this application provides a chip system. The chip system includes a processor, and may further include a memory, to implement functions of the first terminal device, the first radio access network device, or the second radio access network device in the foregoing methods. The chip system may include a chip, or may include a chip and another discrete component, for example, an amplifier, a digital-to-analog converter, or an analog-to-digital converter.

According to a seventeenth aspect, an embodiment of this application further provides a communication system. The communication system includes the first radio access network device described in the eighth aspect or a communication apparatus that supports the first radio access network device in implementing the method described in the first aspect, the first terminal device described in the ninth aspect or a communication apparatus that supports the first terminal device in implementing the method described in the second aspect, and the second radio access network device described in the tenth aspect or a communication apparatus that supports the second radio access network device in implementing the method described in the third aspect or the seventh aspect; or the communication system includes the first radio access network device described in the eleventh aspect or a communication apparatus that supports the first radio access network device in implementing the method described in the first aspect, the first terminal device described in the twelfth aspect or a communication apparatus that supports the first terminal device in implementing the method described in the second aspect, and the second radio access network device described in the thirteenth aspect or a communication apparatus that supports the second radio access network device in implementing the method described in the third aspect or the seventh aspect.

In addition, for a technical effect brought by the design manner of any one of the foregoing aspects, refer to technical effects brought by different design manners of the first aspect to the seventh aspect.

In the embodiments of this application, names of the first terminal device, the first radio access network device, the second radio access network device, and the communication apparatus constitute no limitation on the devices. In an actual implementation, these devices may have other names. Provided that functions of the devices are similar to those in the embodiments of this application, the devices fall within the scope of the claims of this application and their equivalent technologies.

DESCRIPTION OF EMBODIMENTS

In the specification and claims, the terms "first", "second", "third" and the like are intended to distinguish different objects but do not limit a particular sequence.

In embodiments of this application, the words such as "example" or "for example" are used to represent giving an example, an illustration, or a description. Any embodiment or design scheme described as the word "example" or "for example" in the embodiments of this application should not be explained as being more preferred or having more advantages than another embodiment or design scheme. Use of the word such as "example" or "for example" is intended to present a related concept in a specific manner.

The following describes implementations of the embodiments of this application in detail with reference to the accompanying drawings.

Figure 1:
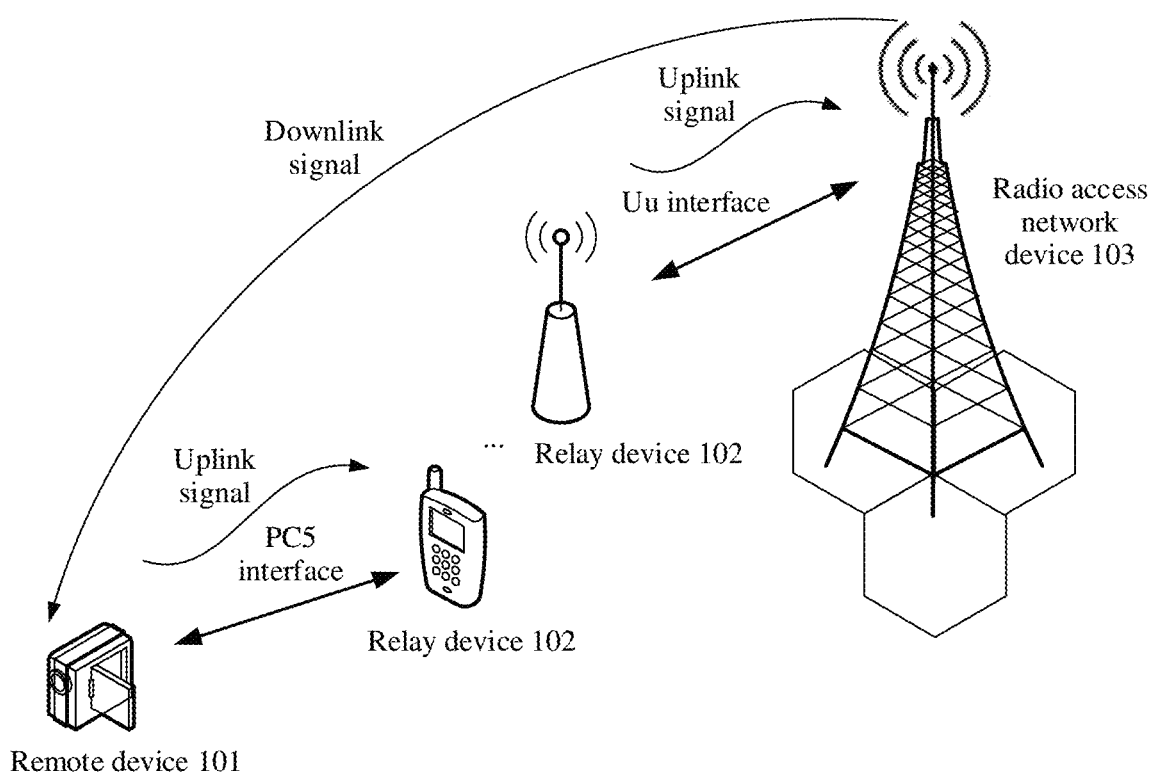
FIG. 1 is an example diagram of a structure of a relay system according to an embodiment of this application.

FIG. 1 is an example diagram of a structure of a relay system according to an embodiment of this application. The relay system may be a long term evolution (LTE) or new radio (NR) system, and is configured to implement communication between a remote device and a radio access network device. As shown in FIG. 1, the relay system may include a remote device 101, relay devices 102, and a radio access network device 103. The remote device 101 may be a device that is relatively far away from the radio access network device 103. The remote device 101 may be connected to the radio access network device 103 in a wireless manner. Because the remote device 101 is a terminal device with limited uplink power, the remote device 101 cannot be directly connected to the radio access network device 103, but is connected to the radio access network device 103 through one or more relay devices 102.

In this embodiment of this application, the terminal device with limited uplink power means that because transmit power of the terminal device is relatively low, the radio access network device cannot directly receive an uplink signal sent by the terminal device to the radio access network device, and the uplink signal sent by the terminal device needs to be forwarded through the relay device.

A wireless communication interface may be established between the remote device 101 and the relay device 102. The relay device 102 may be classified into a user equipment (UE) type relay device and a base station type relay device based on a wireless communication interface manner between the remote device 101 and the relay device 102. The UE type relay device means that the relay device communicates with the remote device through a sidelink, and a solution that corresponds to the sidelink and that is defined in 3GPP specifications is used. The sidelink is also referred to as a PC5 link, a device-to-device (D2D) link, or the like in some documents. The base station type relay device means that the relay device communicates with the remote device through an LTE air interface or an NR air interface, and a solution that corresponds to the air interface and that is defined in the 3GPP specifications is used. A wireless communication interface (for example, the LTE air interface or the NR air interface) may be established between the radio access network device 103 and the relay device 102 closest to the radio access network device 103.

For example, when the remote device 101 needs to send user plane data or control plane data to the radio access network device 103, the remote device 101 may send the user plane data or the control plane data to the relay device 102 through the wireless communication interface (for example, a PC5 interface) between the remote device 101 and the relay device 102, and the relay device 102 may send the user plane data or the control plane data of the remote device 101 to the radio access network device 103 through the wireless communication interface between the relay device 102 and the radio access network device 103. Correspondingly, when the radio access network device 103 needs to send the user plane data or the control plane data to the remote device 101, the radio access network device 103 may also send the user plane data or the control plane data to the remote device 101 through the relay device 102.

In the embodiments of this application, the relay device is the UE type relay, namely, a terminal device, or is referred to as user equipment.

It should be noted that the network architecture shown in FIG. 1 is merely an example architectural diagram. Although not shown, in addition to the network function entities shown in FIG. 1, the network shown in FIG. 1 may further include another function entity, for example, a core network element. This is not limited. The radio access network device 103 may be connected to a core network device in a wireless or wired manner. The core network device and the radio access network device 103 may be different physical devices that are independent of each other, or functions of the core network device and logical functions of the radio access network device 103 may be integrated into a same physical device, or some functions of the core network device and some functions of the radio access network device 103 may be integrated into one physical device. In addition, quantities of core network devices, network devices, and terminal devices included in the communication system are not limited in this embodiment of this application.

For example, the remote device 101 in FIG. 1 may be remote user equipment, for example, may be a wearable device (a smartwatch, a smart band, or the like), or may be smart furniture (or household appliances), a vehicle in an internet of vehicles, a robotic arm in an industrial internet, or other devices such as intelligent refueling devices that are relatively far away from the radio access network device and need to be connected to the radio access network device through the relay device.

The relay device 102 in FIG. 1 may be relay user equipment. For example, the relay device may be any handheld device, vehicle-mounted device, wearable device, or computing device that has a wireless communication function, or another processing device connected to a wireless modem. The relay device may further include: a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or a mobile station (MS). This is not limited.

The radio access network device 103 in FIG. 1 may be an entity configured to transmit or receive a signal on a network side. The radio access network device may also be named an access network device, and is mainly configured to implement functions such as a radio physical entity function, resource scheduling and radio resource management, radio access control, and mobility management. For example, the radio access network device may be a radio access network (RAN) next generation NodeB (gNB), an LTE NodeB eNB, or any other access unit. In addition, in the embodiments of this application, the radio access network device serves a cell, and the remote device communicates with the radio access network device on a transmission resource (for example, a frequency domain resource) used for the cell. The cell may be a cell corresponding to the radio access network device (for example, a base station), and the cell may belong to a macro base station or a base station corresponding to a small cell. The small cell herein may include a metro cell, a micro cell, a pico cell, a femto cell, or the like. These small cells have features of small coverage and low transmit power, and are suitable for providing a high-rate data transmission service. In addition, in another possible case, the radio access network device may be another apparatus that provides the wireless communication function for the remote device. A specific technology and a specific device form used by the radio access network device are not limited in the embodiments of this application. For ease of description, in the embodiments of this application, the apparatus that provides the wireless communication function for the remote device is referred to as the radio access network device.

The radio access network device and the remote device may be deployed on land, including being deployed indoor or outdoor, or being handheld or vehicle-mounted; may be deployed on water; or may be deployed on an airplane, a balloon, and a satellite in the air. Application scenarios of the radio access network device and the remote device are not limited in the embodiments of this application.

Communication between the radio access network device and the remote device and communication between remote devices may be performed by using a licensed spectrum, or an unlicensed spectrum, or both a licensed spectrum and an unlicensed spectrum. A spectrum resource used between the radio access network device and the remote device are not limited in the embodiments of this application.

An uplink usually refers to a channel through which a signal is transmitted from the terminal device to the radio access network device. A downlink usually refers to a channel through which a signal is transmitted from the radio access network device to the terminal device. In the embodiments of this application, in a bidirectional relay scenario, the uplink may be a physical channel from the remote device to the relay device and a physical channel from the relay device to the radio access network device. The downlink may be a physical channel from the radio access network device to the relay device and a physical channel from the relay device to the remote device. In a unidirectional relay scenario, the uplink may be a physical channel from the remote device to the relay device and a physical channel from the relay device to the radio access network device. The downlink may be a physical channel from the radio access network device to the remote device. The embodiments of this application are applicable to the unidirectional relay scenario.

Although it is specified in an existing relay technical standard that a remote device may communicate with a radio access network device through a relay device, when the remote device moves from a coverage area of a source radio access network device to a coverage area of a target access network device, how the remote device performs uplink communication with the target radio access network device through the relay device is not correspondingly specified.

To resolve the foregoing problem, an embodiment of this application provides a relay communication method. A basic principle of the method is as follows: after receiving first information sent by a first terminal device, a first radio access network device may determine, based on the first information, a second terminal device that provides, in a target cell, a relay service for the first terminal device, where the first information is used to indicate that the first terminal device is a terminal device with limited uplink power. The first radio access network device sends second information to a second radio access network device, where the second information is used to indicate the second terminal device that provides, in the target cell, the relay service for the first terminal device. According to the relay communication method provided in this embodiment of this application, when the first terminal device needs to be connected to the target cell of the second radio access network device, the first radio access network device may determine, based on the indication information indicating that the first terminal device is a terminal device with limited uplink power, that both the first terminal device and the second terminal device are to be connected to the target cell and the second terminal device provides, in the target cell, the relay service for the first terminal device. In this way, a remote device can still perform uplink communication with a target radio access network device through a relay device.

Figure 2:
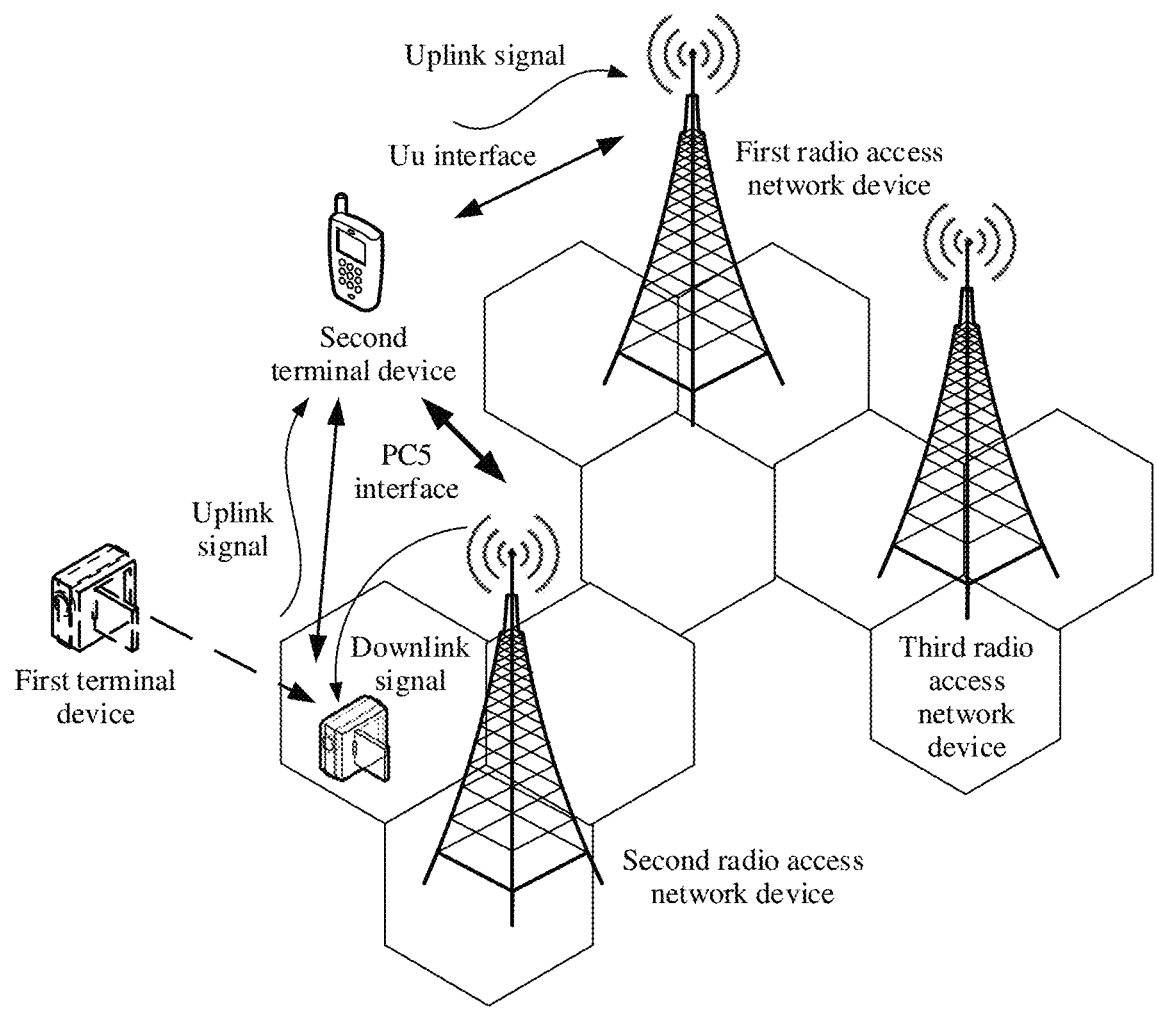
FIG. 2 is an example diagram of a relay communication scenario according to an embodiment of this application.

FIG. 2 is an example diagram of a relay communication scenario according to an embodiment of this application. It is assumed that a remote device is a first terminal device, any one or more relay devices directly connected to the remote device are second terminal devices, a source radio access network device currently connected to the remote device is a first radio access network device, and a second radio access network device and a third radio access network device are adjacent to the first radio access network device. It is assumed that the first terminal device moves from a coverage area of the first radio access network device to a coverage area of the second radio access network device, and a relay communication method provided in the embodiments of this application is described in detail by using an example in which a target radio access network device to which the remote device needs to be connected is the second radio access network device.

For example, a wireless communication interface, for example, a PC5 interface or a sidelink, is established between the first terminal device and the second terminal device, and the first terminal device and the second terminal device may communicate with each other through the PC5 interface or the sidelink. A wireless communication interface, for example, an LTE air interface or an NR air interface, is established between the second terminal device and the first radio access network device. For example, the LTE air interface may be a Uu interface. The second terminal device and the first radio access network device may communicate with each other through the LTE air interface or the NR air interface. Alternatively, there is no direct wireless communication interface between the second terminal device and the first radio access network device, and a connection between the second terminal device and the first radio access network device is maintained through a relay of another terminal device. A wired communication interface, for example, an X2 interface or an Xn interface, is established between the first radio access network device and the second radio access network device. The first radio access network device and the second radio access network device may communicate with each other through the LTE X2 interface or the NR Xn interface. It should be noted that in the following embodiments of this application, names of messages between network elements, names of parameters in messages, or the like are merely examples, and there may be other names in specific implementations. This is not specifically limited in the embodiments of this application.

Figure 3:
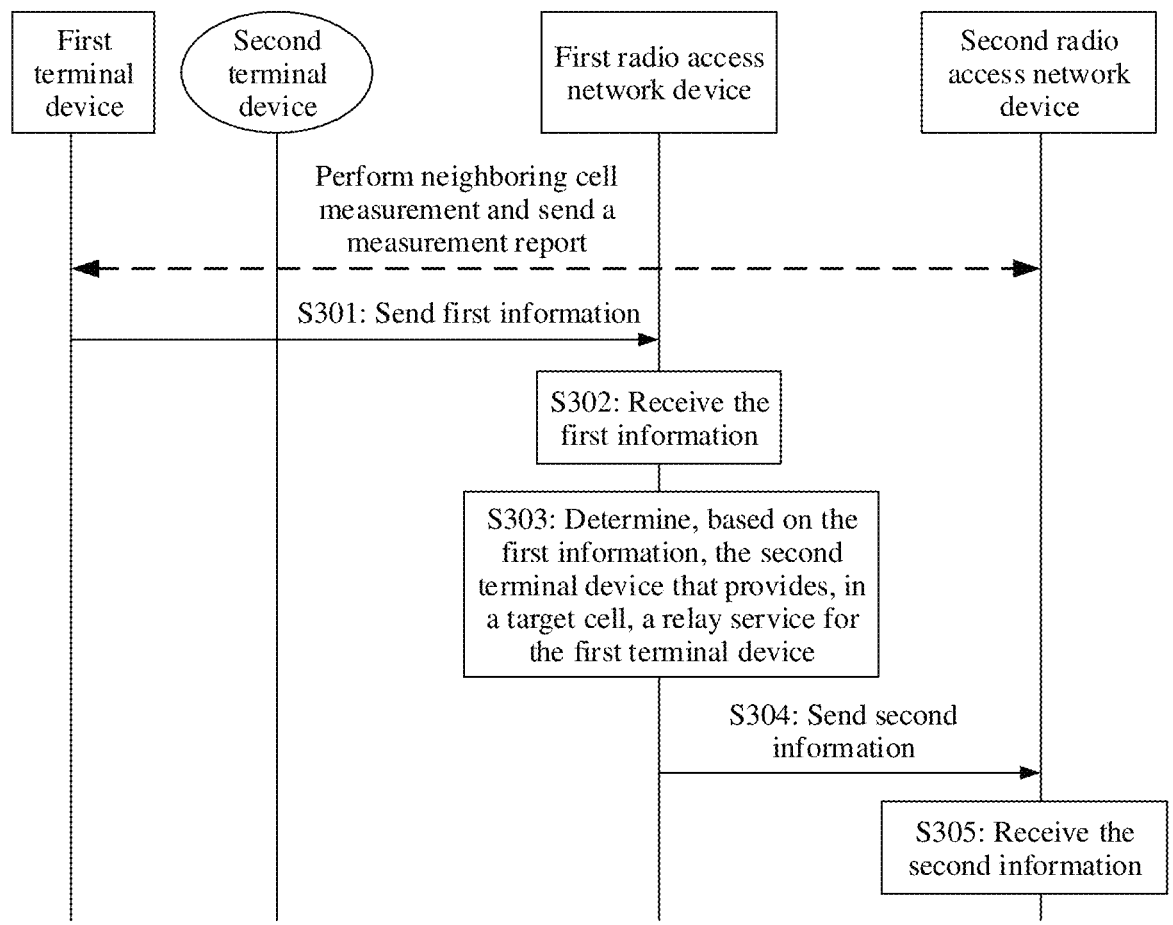
FIG. 3 is an example flowchart of a relay communication method according to an embodiment of this application.

In a first implementable manner, when both an uplink and a downlink between the first terminal device and a radio access network device are switched or transferred, the first terminal device or the first radio access network device may determine that a terminal device that provides, in a target cell, a relay service for the first terminal device may be the second terminal device. As shown in FIG. 3, the method may include the following steps.

S301: The first terminal device sends first information to the first radio access network device.

After accessing the first radio access network device, the first terminal device sends the first information to the first radio access network device, where the first information is used to indicate that the first terminal device is a terminal device with limited uplink power. Alternatively, the first radio access network device may first send a request message to the first terminal device. After receiving the request message, the first terminal device sends the first information to the first radio access network device based on the request message. This is not limited in this embodiment of this application. It should be noted that currently, the first terminal device communicates with the first wireless network device through the second terminal device used as a relay.

In an example, the first information may be used to indicate, by using a user equipment category (ue-category) information element defined in 3GPP specifications, that the first terminal device is a terminal device with limited uplink power. When the ue-category is a category M1 or a category M2, that a bandwidth of the first terminal device is limited indicates that the uplink power of the first terminal device is limited. When the ue-category is a category NB 1 or a category NB 2, that the first terminal device is a narrowband internet of things (NB-IoT) indicates that the uplink power of the first terminal device is limited. Optionally, a new type of ue-category may be added to directly indicate that the uplink power of the first terminal device is limited. The first terminal device may include the first information in UE capability information.

For example, a new information element uplink power constraint is added to a UE capability information message, and the uplink power constraint is used to indicate that the first terminal device is a terminal device with limited uplink power. Alternatively, the ue-category information element in the foregoing example is used in a terminal device capability information center to indicate that the first terminal device is a terminal device with limited uplink power. The first terminal device may actively send the UE capability information message including the first information to the first radio access network device, or may send the UE capability information message including the first information to the first radio access network device based on the request message sent by the first radio access network device to the first terminal device. For example, the first radio access network device first sends a UE capability request message to the first terminal device, and then the first terminal device feeds back the UE capability information message to the first radio access network device. Alternatively, the first information may be included in another radio resource control (RRC) message. For example, the another RRC message may be an RRC connection setup request (RRC connection request or RRC setup request). Finally, the first terminal device forwards the first information to the first radio access network device through the second terminal device. When forwarding the RRC message, the second terminal device may further carry an identifier of the first terminal device.

The identifier of the first terminal device may be an identifier of the first terminal device on a sidelink or an identifier allocated by the first radio access network device to the first terminal device, for example, a cell radio network temporary identifier (C-RNTI), so that the first radio access network device determines a terminal device that sends the first information. In the following description, the identifier of the first terminal device may be the identifier of the first terminal device on the sidelink or the identifier allocated by the first radio access network device to the first terminal. This is not limited in this application. Alternatively, the first terminal device may include the first information in a packet header of a protocol layer, for example, a radio link control (RLC) layer, a media access control (MAC) layer, a physical layer, or a newly added adaptation layer of a PC5 interface, between the first terminal device and the second terminal device. After receiving the first information, the second terminal device adds the first information to a Uu protocol layer between the second terminal device and the first radio access network device, and may further carry the identifier of the first terminal device on the sidelink or the identifier allocated by the first radio access network device to the first terminal, for example, the C-RNTI, so that the first radio access network device determines a terminal device that sends the first information. The identifier of the first terminal device on the sidelink may be understood as a unique identifier that can be used by the second terminal device to identify the first terminal device.

In a process in which the first terminal device moves from the coverage area of the first radio access network device to the coverage area of the second radio access network device, the first terminal device may perform neighboring cell measurement to obtain information such as a cell identifier, cell signal quality, and/or cell signal power of a cell in a coverage area of another radio access network device adjacent to the first radio access network device. FIG. 2 shows information such as a cell identifier, cell signal quality, and/or cell signal power of a cell in the coverage area of the second radio access network device, and information such as a cell identifier, cell signal quality, and/or cell signal power of a cell in a coverage area of the third radio access network device. For a specific measurement method, refer to a conventional technology. In this case, cell signal quality of a cell to which the first terminal device is connected and that is in the coverage area of the first radio access network device may be relatively poor, so that the first terminal device needs to be reconnected to a cell that is in a coverage area of the radio access network device and that has relatively good signal quality. The first terminal device may send a measurement report to the first radio access network device, where the measurement report includes cell identifiers of N cells and signal quality and/or signal power of the N cells that are measured by the first terminal device, and N is an integer greater than 0.

In addition, the first terminal device may further measure a relay device adjacent to the first terminal device, to obtain an identifier, signal quality, and/or signal power of the relay device. The relay device adjacent to the first terminal device may be a relay device in the coverage area of the first radio access network device and a relay device in a coverage area of a neighboring cell measured by the first terminal device. Therefore, the measurement report may further include relay information. The relay information includes identifiers of M relay devices measured by the first terminal device, and M is an integer greater than 0. Optionally, the first terminal device may first evaluate, according to a preset rule, the M measured relay devices. For example, the first terminal device determines one or more relay devices based on a distance or signal quality between the relay device and the first terminal device, and sends, to the first radio access network device, information about X relay devices determined by the first terminal device according to the preset rule, where X is an integer greater than 0 and less than or equal to M. In this case, the relay information is identifiers of the X relay devices, where the X relay devices are relay devices whose distances from the first terminal device are less than a preset threshold or whose signal quality is greater than a preset threshold.

Optionally, the relay device sends a discovery signal on the sidelink, where the discovery signal includes one or more of identifiers of a cell and a base station that are connected to the relay device. The cell identifier may be a physical cell identifier (PCI), an evolved universal mobile telecommunication system territorial radio access network (E-UTRAN) cell global identifier (CGI), a new radio cell global identifier (NR CGI), or the like. The base station identifier may be a global base station identifier (Global gNB ID, Global eNB ID, or Global ng-eNB ID), a global new radio radio access network node identifier (Global NG-RAN Node ID), or the like. The first terminal device may determine, based on the discovery signal sent by the relay device, a radio access network device connected to the relay device. Therefore, in addition to the identifier, the signal quality, and/or the signal power of the relay device, one or more of the identifiers of the cell and the base station that are connected to the relay device are further included when the first terminal device reports the measurement report to the first radio access network device.

S302: The first radio access network device receives the first information sent by the first terminal device.

S303: The first radio access network device determines, based on the first information, the second terminal device that provides, in the target cell, the relay service for the first terminal device.

After receiving the first information and the measurement report sent by the first terminal device, the first radio access network device determines to hand over the first terminal device to the second radio access network device in which the target cell is located, or adds the second radio access network device in which the target cell is located as a secondary base station of the first terminal device.

For example, the first radio access network device may determine, based on an A3 event or an A4 event, that signal quality of the target cell to which the first terminal device is to be connected is higher than signal quality of a source cell to which the first terminal device is connected, so that the first terminal device needs to be handed over to the target cell. Alternatively, the first radio access network device may determine, based on an A5 event, that signal quality of the target cell to which the first terminal device is to be connected is higher than a first threshold, and signal quality of a source cell to which the first terminal device is connected is lower than a second threshold, so that the first terminal device needs to be connected to the target cell. The source cell is a cell in a coverage area of a radio access network device to which the first terminal device is currently connected, and the target cell is a cell in a coverage area of a radio access network device to which the first terminal device needs to be connected. Alternatively, the second radio access network device in which the target cell is located needs to be added as the secondary base station. In the following description, behaviors of handing over to the target cell and adding the radio access network device in which the target cell is located as the secondary base station are collectively referred to as being connected to the target cell. In the following description, it is assumed that the source cell is a cell in the coverage area of the first radio access network device. The first radio access network device determines that the first terminal device needs to be connected to the cell in the coverage area of the second radio access network device, and the target cell is the cell in the coverage area of the second radio access network device.

For example, a target cell identifier may be determined by the first radio access network device and sent to the second radio access network device, or may be determined by the second radio access network device. For example, in a handover scenario, the target cell identifier is determined by the first radio access network device. The target cell identifier is carried when the first radio access network device sends a handover request message to the second radio access network device. For example, in a scenario in which the secondary base station is added, the target cell identifier is determined by the second radio access network device. In a possible case, the first radio access network device sends, to the second radio access network device, the measurement report sent by the first terminal device or a measurement report related to the second radio access network device. The second radio access network device selects, based on the measurement report, a cell as a primary cell served by the secondary base station, namely, the target cell mentioned in this specification. The second radio access network device may further select one or more cells as secondary cells served by the secondary base station. In another possible case, the first radio access network device selects an appropriate secondary cell group (SCG) based on the measurement report sent by the first terminal device, and sends the appropriate secondary cell group to the second radio access network device. The second radio access network device selects a cell from the secondary cell group as a primary cell served by the secondary base station, namely, the target cell mentioned in this specification. The second radio access network device may further select one or more cells as secondary cells served by the secondary base station from the secondary cell group.

The first information is used to indicate that the first terminal device is a terminal device with limited uplink power. The first radio access network device may determine, based on the first information, that an uplink signal sent by the first terminal device to the first radio access network device cannot directly arrive at the first radio access network device, and the first radio access network device can receive the uplink signal sent by the first terminal device only after the relay device forwards the uplink signal. Alternatively, the first terminal device forwards the first information to the first radio access network device through the second terminal device, so that the first radio access network device learns that the uplink signal can be transmitted to the first radio access network device only after the relay device forwards the uplink signal.

When the measurement report received by the first radio access network device does not include the relay information, and the first terminal device is connected to the first radio access network device through the second terminal device, the first radio access network device may determine, based on the first information, that the terminal device that provides, in the target cell, the relay service for the first terminal device may be the second terminal device. It may be understood that, the first radio access network device determines that both the first terminal device and the second terminal device are to be connected to the second radio access network device in which the target cell is located.

Optionally, the first radio access network device may further receive indication information sent by the first terminal device, and the indication information is used to indicate that the second radio access network device does not find an appropriate relay device.

When the measurement report received by the first radio access network device includes the relay information, but the first radio access network device cannot determine whether the relay device corresponding to the received relay information is connected to the second radio access network device, the first radio access network device may further determine, based on the first information, that the terminal device that provides, in the target cell, the relay service for the first terminal device may be the second terminal device. It may be understood that, the first radio access network device determines that both the first terminal device and the second terminal device are to be connected to the second radio access network device in which the target cell is located.

Optionally, if the first radio access network device can determine that a relay device connected to the second radio access network device exists in the relay devices corresponding to the received relay information, when the measurement report sent by the first terminal device includes identifiers/an identifier of a cell and/or a base station that are/is connected to the relay device, the first radio access network device may determine, based on the identifiers/identifier of the cell and/or the base station that are/is connected to the relay device, that the first terminal device may not find the relay device connected to the second radio access network device, and the first radio access network device determines that both the first terminal device and the second terminal device are to be connected to the second radio access network device in which the target cell is located. Alternatively, the first terminal device may be unable to determine whether the relay device is connected to the second radio access network device, but the first radio access network device and the second radio access network device have exchanged in advance, through an X2 interface or an Xn interface, a list of relay devices in the coverage area of the first radio access network device and the coverage area of the second radio access network device, where the list of relay devices includes an identifier of each relay device on the sidelink. In this case, the first radio access network device may determine, based on the information about the relay device included in the measurement report sent by the first terminal device, whether the relay device is connected to the second wireless network device. When the first terminal device can find the relay device connected to the second radio access network device, the first terminal device may provide the relay service for the first terminal device by using the relay device in the coverage area of the second radio access network device.

It should be noted that, the first information and the measurement report that are sent by the first terminal device and that are received by the first radio access network device are forwarded to the first radio access network device through the second terminal device. For a specific forwarding process, refer to a conventional technology.

In addition, the relay communication method provided in this embodiment of this application is for a unidirectional relay scenario. The first terminal device may further receive a downlink signal sent by the first radio access network device, and the downlink signal does not need to be forwarded by the relay device. Therefore, the first radio access network device and the first terminal device may perform a handover procedure or a dual connectivity (DC) secondary base station addition procedure based on a conventional technology, and the first terminal device is handed over or establish dual connectivity to the cell in the coverage area of the second radio access network device to continue downlink communication. For details, refer to details in a conventional technology.

S304: The first radio access network device sends second information to the second radio access network device.

The second information is used to indicate the second terminal device that provides, in the target cell, the relay service for the first terminal device. For example, the second information may include the identifier of the first terminal device and an identifier of the second terminal device. Optionally, the second information includes an identifier of the second terminal device. Optionally, the second information may include third information, and the third information is used to indicate that the second terminal device provides, in the target cell, the relay service for the first terminal device. Optionally, the second information may include an identifier of the second terminal device and third information, and the third information is used to indicate that the second terminal device provides, in the target cell, the relay service for the first terminal device.

It should be noted that the first radio access network device may send the second information to the second radio access network device by using a handover request message in a handover procedure. Alternatively, the first radio access network device may send the second information to the second radio access network device by using a secondary base station addition request message (SeNB addition request or SgNB addition request). For example, in a first possible case, one information element, namely, the second information, is added to the handover request message or the secondary base station addition request message, and a specific form of the information element may be a relay identifier (relay ID). The relay ID may be an identifier of the second terminal device on the sidelink, or may be an identifier configured by the first radio access network device for the second terminal device, for example, a C-RNTI or another identifier used to uniquely identify the second terminal device. In a second possible case, two information elements, namely, the second information, are newly added to the handover request message or the secondary base station addition request message. One of the two information elements is a UE ID, and the other is a relay ID. The UE ID may be an identifier of the first terminal device on the sidelink, or may be an identifier configured by the first radio access network device for the first terminal device, for example, a C-RNTI or another identifier used to uniquely identify the first terminal device. Specific explanations of the relay ID are the same as those described above. In a third possible case, one information element, namely, the third information, is newly added to the handover request message or the secondary base station addition request message, for example, an addrelaytogether information element. The information element may include two values: true and false. Alternatively, the addrelaytogether information element may have no value. Provided that the addrelaytogether information element is included, it indicates that the second terminal device provides, in the target cell, the relay service for the first terminal device. In a fourth possible case, two information elements are added to the handover request message or the secondary base station addition request message. One of two information elements is a relay ID, and the other is an addrelaytogether information element. Specific explanations are the same as those described above. That is, the addrelaytogether information element is used to indicate that the relay ID provides, in the target cell, the relay service for the first terminal device.

The secondary base station addition request message may further include a data sending request (or data forwarding request) indication. After receiving the data sending request indication, the second radio access network device feeds back, to the first radio access network device, general packet radio service tunneling protocol for the user plane (GTP-U) tunnel information that is of a data radio bearer (DRB) or protocol data unit (PDU) session granularity and that is configured for the first terminal device. The GTP-U tunnel information is used for uplink data that is sent by the first radio access network device and that has not been delivered by the first terminal device to a core network, or is used for downlink data that has not been sent by the first radio access network device or downlink data for which an acknowledgment message has not been received from the first terminal device. For example, the GTP-U tunnel information sent by the second radio access network device includes a DRB identifier or a PDU session identifier, and GTP-U tunnel address information, such as an IP address and tunnel endpoint information (TEID). In addition, the second radio access network device may further feed back, to the first radio access network device, GTP-U tunnel information that is of the DRB or PDU session granularity and that is configured for the second terminal device. The GTP-U tunnel information is used for uplink data that is sent by the first radio access network device and that has not been delivered by the second terminal device to the core network, or downlink data that has not been sent by the first radio access network device or downlink data for which an acknowledgment message has not been received from the second terminal device.

S305: The second radio access network device receives the second information sent by the first radio access network device.

In the following description, a protocol specification may be a rule that is agreed on in advance and that needs to be followed by all devices. For example, if the second information includes the identifier of the second terminal device, the second radio access network device may determine, based on the second information, that the first radio access network device indicates that the terminal device that provides, in the target cell, the relay service for the first terminal device is the second terminal device. If the second information includes the identifier of the first terminal device and the identifier of the second terminal device, the second radio access network device may determine, based on the identifier of the first terminal device and the identifier of the second terminal device, that the first radio access network device indicates that the terminal device that provides, in the target cell, the relay service for the first terminal device is the second terminal device. If the second information includes the third information, the second radio access network device may determine, based on the third information, that the terminal device that provides, in the target cell, the relay service for the first terminal device is the second terminal device. The third information is used to indicate that the second terminal device provides, in the target cell, the relay service for the first terminal device. If the second information includes the identifier of the second terminal device and the third information, the second radio access network device may determine, based on the identifier of the second terminal device and the third information, that the terminal device that provides, in the target cell, the relay service for the first terminal device is the second terminal device.

According to the relay communication method provided in this embodiment of this application, when the first terminal device needs to be connected to the target cell of the second radio access network device, the first radio access network device may determine, based on the indication information indicating that the first terminal device is a terminal device with limited uplink power, that both the first terminal device and the second terminal device are to be connected to the target cell and the second terminal device provides, in the target cell, the relay service for the first terminal device. In this way, a remote device can still perform uplink communication with a target radio access network device through a relay device.

Figure 4:
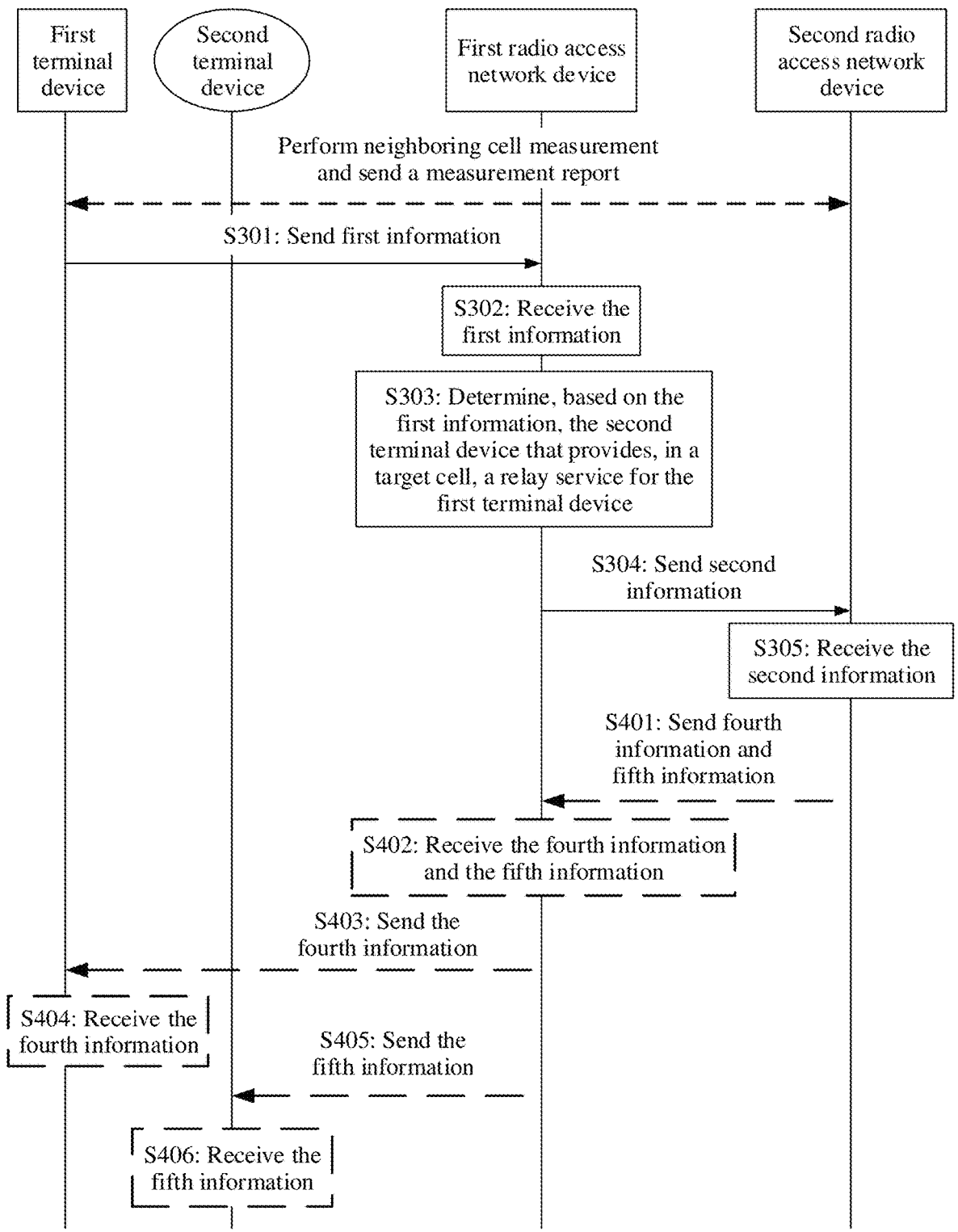
FIG. 4 is another example flowchart of a relay communication method according to an embodiment of this application.

Further, after the second radio access network device receives the second information sent by the first radio access network device, that is, after S305, as shown in FIG. 4, this embodiment of this application further includes the following steps.

S401: The second radio access network device sends fourth information and fifth information to the first radio access network device.

The fourth information includes the target cell identifier and a first C-RNT allocated to the first terminal device. The target cell identifier may be determined by the first radio access network device and sent to the second radio access network device, or may be determined by the second radio access network device. For specific description, refer to S303. The fourth information may further include a radio resource configuration dedicated for the first terminal device. For example, the radio resource configuration dedicated includes a signaling radio bearer list, a data radio bearer list, a media access control-main configuration, and a physical configuration dedicated. The fifth information includes the target cell identifier, a second C-RNTI allocated to the second terminal device, and a random access resource. Particularly, the target cell identifier included in the fifth information is the same as the target cell identifier included in the fourth information. The random access resource includes one or more of a random access preamble index, a random access mask index, a radio resource configuration common, and the like. The radio resource configuration common mainly includes a random access common configuration, a broadcast control channel common configuration, a paging control channel common configuration, and the like. The fifth information may further include a radio resource configuration dedicated for the second terminal device. The radio resource configuration dedicated includes a signaling radio bearer list, a data radio bearer list, a MAC-main configuration, a physical configuration dedicated, and the like that are configured for the second terminal device. The radio resource configuration dedicated may further include the first C-RNTI and a mapping relationship that is configured for the second terminal device and that is between a signaling radio bearer of the second terminal device and a signaling radio bearer of the first terminal device, or a mapping relationship that is configured for the second terminal device and that is between a data radio bearer of the second terminal device and a data radio bearer of the first terminal device. For example, an SRB 1 of the second terminal device corresponds to an SRB 1 of the first terminal device, a DRB 1 of the second terminal device corresponds to a DRB 1 and a DRB 2 of the first terminal device, and a DRB 2 of the second terminal device corresponds to a DRB 3 of the first terminal device. Alternatively, the radio resource configuration dedicated includes a mapping relationship between a signaling radio bearer of the second terminal device and a sidelink logical channel between the first terminal device and the second terminal device, or a mapping relationship between a data radio bearer of the second terminal device and a sidelink logical channel between the first terminal device and the second terminal device. For example, the SRB 1 of the second terminal device corresponds to a logical channel 1 between the first terminal device and the second terminal device, that is, LCID=1, and the DRB 1 of the second terminal device corresponds to a logical channel 2 and a logical channel 3 between the first terminal device and the second terminal device, that is, LCID=2 and LCID=3. Alternatively, the radio resource configuration dedicated includes a mapping relationship between a signaling/data radio bearer of the second terminal device and a sidelink logical channel between the first terminal device and the second terminal device, and a mapping relationship between the signaling/data radio bearer of the second terminal device and a signaling/data radio bearer of the first terminal device. For example, the SRB 1 of the second terminal device corresponds to the logical channel 1 between the first terminal device and the second terminal device, that is, LCID=1, and also corresponds to the SRB 1 of the first terminal device. The DRB 1 of the second terminal device corresponds to the logical channel 2 and the logical channel 3 between the first terminal device and the second terminal device, that is, LCID=2 and LCID=3, and also corresponds to the DRB 1 and the DRB 2 of the first terminal device.

In addition, the fourth information and the fifth information may be encapsulated in a same interface message, for example, a handover request acknowledgment message, or a secondary base station addition request acknowledgment (SeNB/SgNB addition request acknowledge) message, sent by the second radio access network device to the first radio access network device. For example, the handover request acknowledgment message or the secondary base station addition request acknowledgment message includes two information elements. One information element includes the fourth information, and the other information element includes the fifth information. To enable the first radio access network device to learn that the fourth information is sent to the first terminal device and the fifth information is sent to the second terminal device, the first radio access network device needs to provide an indication when providing the fourth information and the fifth information. For example, when sending the handover request acknowledgment message, the second radio access network device defines one information element as a target base station to source base station transparent transmission container (Target eNB/gNB to Source eNB/gNB Transparent Container). The transparent transmission container includes the fourth information. The second radio access network device defines the other information element as a target base station to source base station transparent transmission container for relay (Target eNB to Source eNB transparent Container for relay). The transparent transmission container includes the fifth information. Alternatively, the second radio access network device defines a target base station to source base station transparent transmission container list (Target eNB/gNB to Source eNB/gNB transparent Container List). The first information element appearing in the transparent transmission container list includes the fourth information, and the second information element includes the fifth information. When sending the secondary base station addition request acknowledgment message, the second radio access network device defines one information element as a secondary base station to master base station container (SeNB/SgNB to MeNB/MgNB Container). The container includes the fourth information. The second radio access network device defines the other information element as a secondary base station to master base station container for relay (SeNB/SgNB to MeNB/MgNB Container for relay). The container includes the fifth information. Alternatively, the second radio access network device defines a secondary base station to master base station container list (SeNB/SgNB to MeNB/MgNB Container List). The first information element appearing in the container list includes the fourth information, and the second information element includes the fifth information.

S402: The first radio access network device receives the fourth information and the fifth information sent by the second radio access network device.

S403: The first radio access network device sends the fourth information to the first terminal device.

The first radio access network device sends the fourth information to the first terminal device. For example, in a handover scenario, the second radio access network device sends a handover command message to the first radio access network device. The handover command message includes the fourth information. For example, the handover command message may be a downlink dedicated control channel message (DL-DCCH-Message). After receiving the fourth information, the first radio access network sends the fourth information to the first terminal device. For example, in a secondary base station addition scenario, the second radio access network device sends an SCG-Config message to the first radio access network device. The SCG-Config message includes the fourth information. For example, the SCG-Config message may be scg-RadioConfig-r12. After receiving the fourth information, the first radio access network sends the fourth information to the first terminal device.

S404: The first terminal device receives the fourth information sent by the first radio access network device.

After receiving the target cell identifier and the first C-RNTI, the first terminal device is connected to the target cell, and establishes a connection to the target cell for communication. When the second information sent by the first radio access network device does not include the identifier of the first terminal device, for example, the first terminal device sends an RRC connection request message through the second terminal device. The RRC connection request message includes the first C-RNTI. After receiving the RRC connection request message forwarded by the second terminal device and obtaining the first C-RNTI, the second radio access network device learns that the first terminal device has been connected through the second terminal device. Subsequently, the second wireless network access device directly sends downlink data to the first terminal. When the second information sent by the first radio access network device includes the identifier of the first terminal device, a method is the same as the foregoing method. To be specific, the first radio access network device identifies the first terminal device based on the first C-RNTI carried in the RRC connection request message. In another method, when forwarding the RRC connection request message sent by the first terminal device, the second terminal device adds an adaptation layer outside the RRC connection request message. The adaptation layer includes the identifier of the first terminal device (for example, the identifier of the first terminal device on the sidelink) and other information. When receiving the RRC connection request message that is from the first terminal device and that is forwarded by the second terminal device, the second radio access network device obtains the identifier of the first terminal device by reading the adaptation layer. The second radio access network device may determine, by comparing the identifier that is of the first terminal device and that is obtained from the adaptation layer with the identifier that is of the first terminal device and that is included in the second message sent by the first radio access network device, that the first terminal device has been connected through the second terminal device.

S405: The first radio access network device sends the fifth information to the second terminal device.

The first radio access network device may directly send the fifth information to the second terminal device; or may include the fifth information in a radio resource control (RRC) reconfiguration message (for example, RRC Connection Reconfiguration or RRC Reconfiguration), and send the fifth information to the second terminal device. Alternatively, the first radio access network device may include the fifth information in downlink control information (DCI), a MAC control element (CE), or another protocol layer, and send the fifth information to the second terminal device.

S406: The second terminal device receives the fifth information sent by the first radio access network device.

After receiving the target cell identifier, the second C-RNTI, and the random access resource, the second terminal device may determine, according to a protocol specification, that the terminal device that provides, in the target cell, the relay service for the first terminal device is the second terminal device. The second terminal device is connected to the target cell, and establishes a connection to the target cell to provide the relay service for the first terminal device. For example, the second terminal device initiates random access to the target cell of the second radio access network device based on the random access resource included in the fifth information. The second radio access network device may determine, based on the random access resource, that the second terminal device is a relay device that is previously specified by the first radio access network device and that needs to be accessed the target cell. Optionally, the fifth information may further include indication information, to explicitly indicate that the second terminal device provides, in the target cell, the relay service for the first terminal device.

When the second information sent by the first radio access network device does not include the identifier of the second terminal device, for example, the second terminal device accesses the second radio access network device based on the random access resource, the second radio access network device may determine, based on a preamble sent by the second terminal or based on a preamble sent by the second terminal device on a specific time-frequency resource, that the second terminal device has accessed the target cell. When the second information sent by the first radio access network device includes the identifier of the second terminal, for example, the second terminal device carries the identifier that is of the second terminal device and that is included in the second message sent by the first radio access network device, for example, the identifier of the second terminal device on the sidelink, in an RRC connection setup request message, and the second radio access network device may determine, by reading the identifier of the second terminal device in the RRC connection setup request message, that the second terminal device has accessed the target cell.

It should be noted that a sequence of the steps of the relay communication method provided in this embodiment of this application may be properly adjusted, and steps may be correspondingly added or deleted based on a situation. For example, a sequence of S403 and S405 may be changed. To be specific, the first radio access network device may first send the fifth information to the second terminal device, and then send the fourth information to the first terminal device. The second terminal device receives the fifth information sent by the first radio access network device, and the first terminal device receives the fourth information sent by the first radio access network device. Any variation readily figured out by a person skilled in the art within the technical scope disclosed in this application shall fall within the protection scope of this application.

Figure 5:
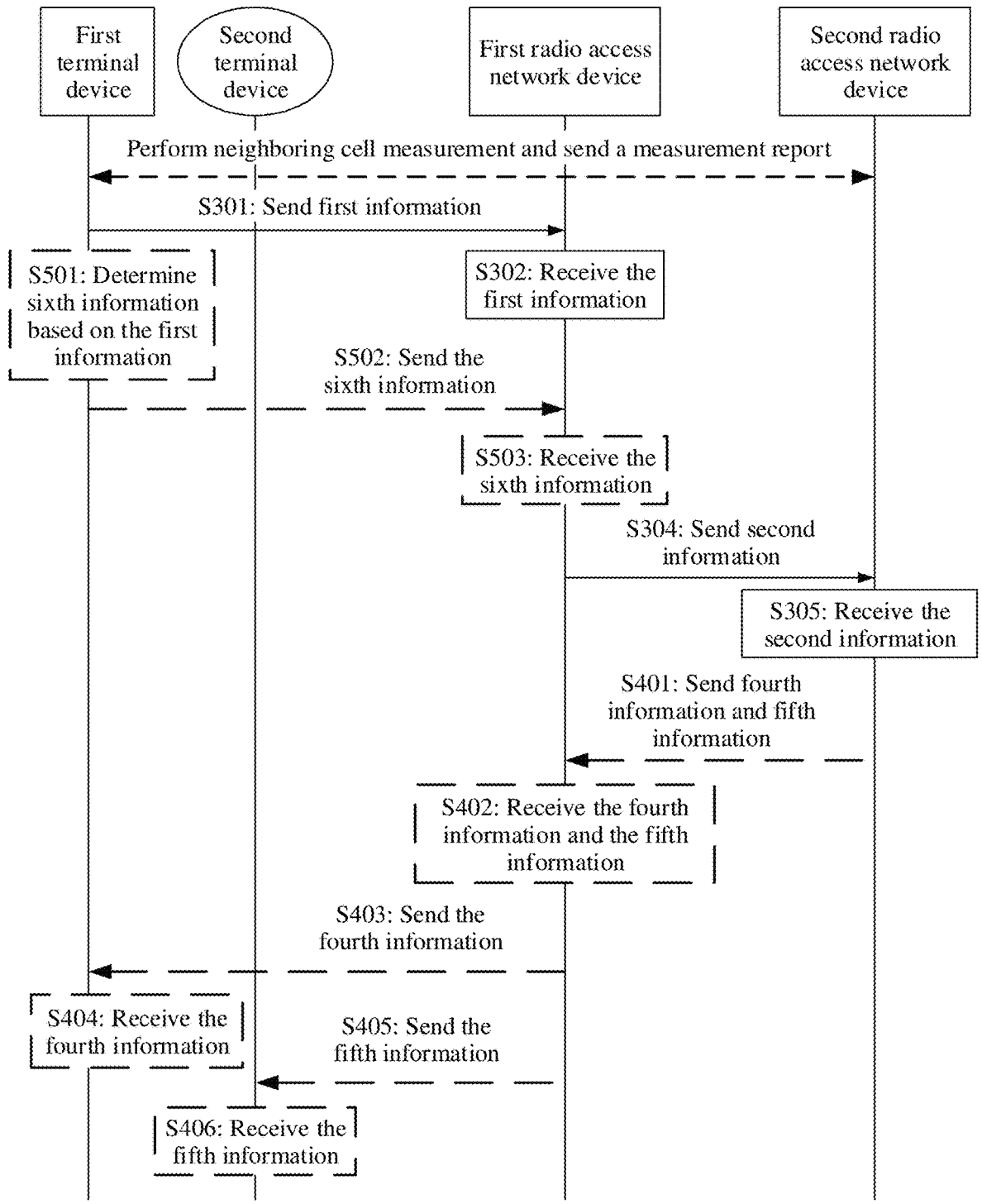
FIG. 5 is still another example flowchart of a relay communication method according to an embodiment of this application.

Optionally, in a possible implementation, the first radio access network device may not need to determine, based on the first information, the second terminal device that provides, in the target cell, the relay service for the first terminal device, that is, S303 does not need to be performed. The first terminal device may send the indication information to the first radio access network device, to indicate the second terminal device that provides, in the target cell, the relay service for the first terminal device. As shown in FIG. 5, this embodiment of this application may further include the following steps.

S501: The first terminal device determines sixth information based on the first information.

The sixth information is used to indicate the second terminal device that provides, in the target cell, the relay service for the first terminal device. For example, the sixth information may include the identifier of the second terminal device, or include the indication information indicating that the second terminal device provides, in the target cell, the relay service for the first terminal device, or include the identifier of the second terminal device and the indication information indicating that the second terminal device provides, in the target cell, the relay service for the first terminal device.

S502: The first terminal device sends the sixth information to the first radio access network device.

It should be noted that the first terminal device may include the sixth information in an RRC message, and forward the sixth information to the first radio access network device through the second terminal device. Alternatively, the first terminal device may include the sixth information in a packet header of a protocol layer, for example, an RLC layer, a MAC layer, a PHY layer, or a newly added adaptation layer of a PC5 interface, between the first terminal device and the second terminal device. After receiving the sixth information, the second terminal device adds the sixth information to a Uu protocol layer between the second terminal device and the first radio access network device, and may further carry the identifier of the first terminal device, so that the first radio access network device determines a terminal device that sends the sixth information. After receiving the sixth information, the first radio access network device determines that the second terminal device provides, in the target cell, the relay service for the first terminal device. When the sixth information includes the identifier of the second terminal device, the first radio access network device directly determines the identifier of the second terminal device. When the sixth information includes the indication information indicating that the second terminal device provides, in the target cell, the relay service for the first terminal device, the first radio access network device determines the identifier of the second terminal device based on the second terminal device that helps the first terminal device forward the sixth information. When the sixth information includes the identifier of the second terminal device and the indication information indicating that the second terminal device provides, in the target cell, the relay service for the first terminal device, the first radio access network device determines that the second terminal device provides, in the target cell, the relay service for the first terminal device.

S503: The first radio access network device receives the sixth information sent by the first terminal device. Perform S304 and subsequent steps.

In another possible implementation, the first terminal device may send seventh information and the target cell identifier to the second terminal device. The seventh information is used to indicate that the first terminal device is to be handed over or connected to the target cell, and request the second terminal device to be handed over or establish dual connectivity to the target cell. The first terminal device may obtain the target cell identifier based on a handover command of the first radio access network device, or may autonomously select the target cell identifier by using the measurement report.

After receiving the seventh information and the target cell identifier sent by the first terminal device, the second terminal device sends eighth information and the target cell identifier to the first radio access network device. The eighth information is used to request the second terminal device to be handed over or establish the dual connectivity to the target cell.

After receiving the eighth information and the target cell identifier sent by the second terminal device, the first radio access network device sends a dual connectivity or handover configuration message to the second terminal device. The handover configuration message may include acknowledgment information, and the acknowledgment information is used by the first radio access network device to agree that the second terminal device continues to serve the first terminal device in the target cell. For example, the first radio access network device configures the dual connectivity for the second terminal device, configures the second radio access network device as the secondary base station, and configures a DRB forwarded by the first terminal device as a secondary cell group bearer (SCG bearer) type. Different from a conventional dual connectivity SCG bearer, in a connection between the second terminal device and the secondary base station, there are only the RLC layer, the MAC layer, the PHY layer, and the adaptation layer on a side of the second terminal device. However, for the conventional dual connectivity SCG bearer, there are a complete PDCP layer, RLC layer, MAC layer, and PHY layer between the terminal device and the secondary base station. For example, in the fifth information provided by the second radio access network device, the data radio bearer list does not include a PDCP layer configuration, namely, PDCP-Config.

In a second implementable manner, when a downlink and an uplink between the first terminal device and a radio access network device are separated, the downlink between the first terminal device and the radio access network device may be switched, and the first terminal device or the first radio access network device determines whether the uplink from the first terminal device to the first radio access network device is maintained. For example, the downlink of the first terminal device is handed over or transferred to the second radio access network device, but the uplink from the first terminal device to the first radio access network device is still maintained.

Figure 6:
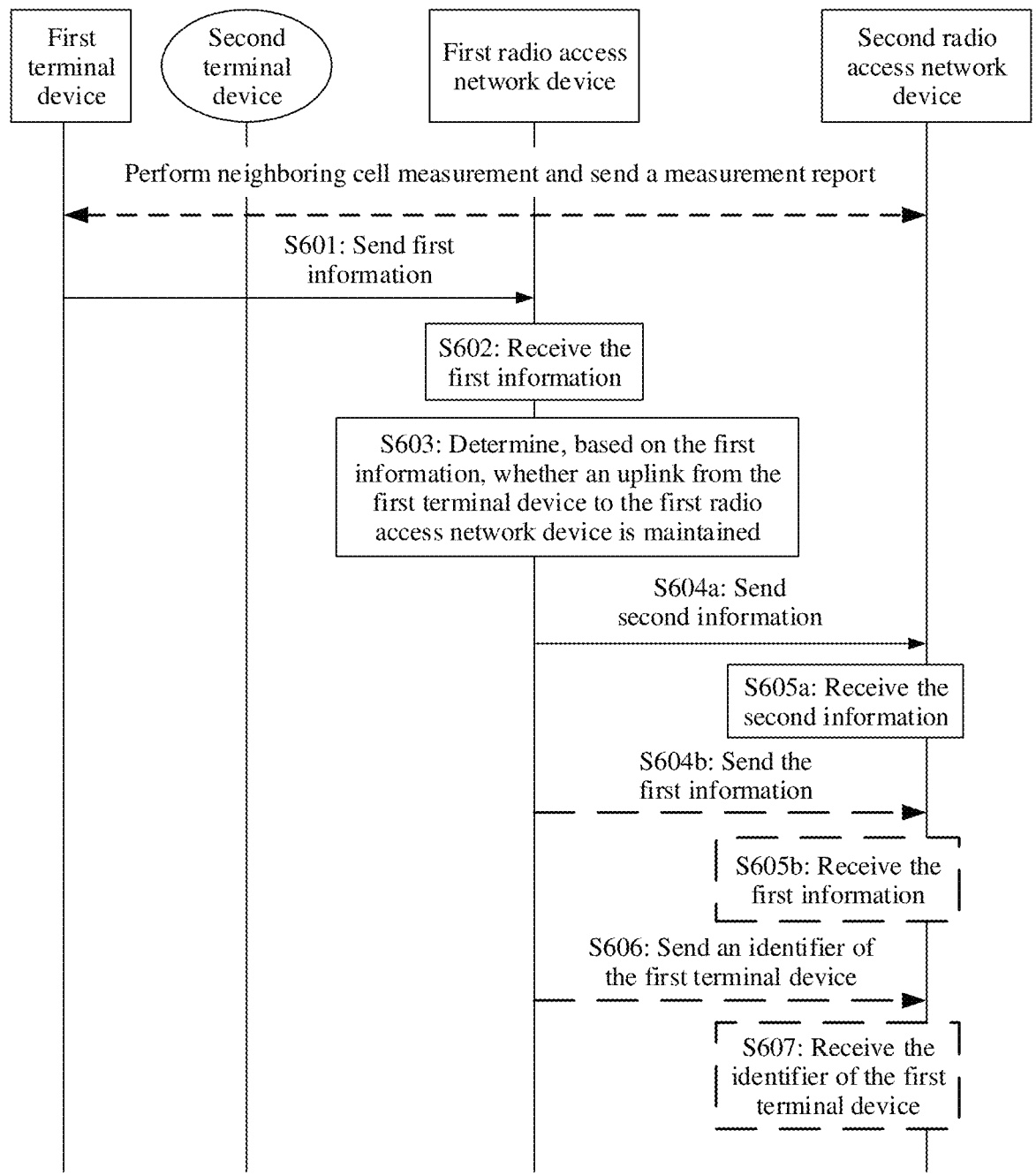
FIG. 6 is yet another example flowchart of a relay communication method according to an embodiment of this application.

Herein, it is referred to as that the downlink and the uplink between the first terminal device and the radio access network device are separated. In the first implementable manner, the downlink and the uplink between the first terminal device and the radio access network device are not separated. As shown in FIG. 6, the method may include the following detailed steps.

S601: The first terminal device sends first information to the first radio access network device.

For a specific detailed explanation, refer to the description in S301.

S602: The first radio access network device receives the first information sent by the first terminal device.

S603: The first radio access network device determines, based on the first information, whether the uplink from the first terminal device to the first radio access network device is maintained.

After receiving the first information and a measurement report sent by the first terminal device, the first radio access network device may report cell information included in the measurement report, to determine a target cell. For a specific detailed explanation, refer to the description in S303.

The first information is used to indicate that the first terminal device is a terminal device with limited uplink power. The first radio access network device may determine, based on the first information, that an uplink signal sent by the first terminal device to the first radio access network device cannot directly arrive at the first radio access network device, and the first radio access network device can receive the uplink signal sent by the first terminal device only after a relay device forwards the uplink signal. Alternatively, the first terminal device forwards the first information to the first radio access network device through the second terminal device, so that the first radio access network device learns that the uplink signal can be sent to the first radio access network device only after the relay device forwards the uplink signal.

The first radio access network device may determine, based on the first information, whether the uplink from the first terminal device to the first radio access network device is maintained. It may be understood that when the measurement report received by the first radio access network device does not include relay information, the first radio access network device may determine, based on the first information, that the uplink from the first terminal device to the first radio access network device is maintained. For example, the first radio access network device determines that the second terminal device provides, in the coverage area of the first radio access network device, a relay service for the first terminal device, that is, the uplink from the first terminal device to the first radio access network device is maintained.

When the measurement report received by the first radio access network device includes relay information, but the first radio access network device cannot determine whether a relay device is connected to the second radio access network device, the first radio access network device may determine, based on the first information, that the uplink from the first terminal device to the first radio access network device is maintained. Optionally, if the first radio access network device may determine that a relay device connected to the second radio access network device exists in relay devices corresponding to the received relay information, the first radio access network device may determine, based on the first information, that the uplink from the first terminal device to the first radio access network device is not maintained. That is, the first radio access network device may determine that the first terminal device may be connected to the second radio access network device by using the relay device in the coverage of the second radio access network device. The relay device provides the relay service for the first terminal device. It may be understood that the first terminal device may establish an uplink to the second radio access network device through the relay device. It should be noted that the relay device in the coverage area of the second radio access network device may be a terminal device closest to the first terminal device or closest to the second radio access network device, or a terminal device with highest signal quality away from the first terminal device or a terminal device with highest signal quality away from the second radio access network device. This is not limited in this embodiment of this application.

For other detailed explanations, refer to the description in S303. After determining, based on the first information, whether the uplink from the first terminal device to the first radio access network device is maintained, the first radio access network device needs to indicate that the second radio access network device does not need to allocate, in the target cell, a random access resource to the first terminal device. In an actual application, the second radio access network device may be notified in an implicit indication manner or an explicit manner. For example, after S603, S604*a* or S604*b* may be performed.

Optionally, the first radio access network device may notify, in the explicit indication manner, the second radio access network device that the second radio access network device does not need to allocate the random access resource to the first terminal device in the target cell. As shown in the following description, this embodiment of this application may further include the following steps.

S604*a*: The first radio access network device sends second information to the second radio access network device.

The second information is used to indicate that the second radio access network device does not need to allocate the random access resource to the first terminal device in the target cell.

S605*a*: The second radio access network device receives the second information sent by the first radio access network device.

Optionally, the first radio access network device may notify, in the implicit indication manner, the second radio access network device that the second radio access network device does not need to allocate the random access resource to the first terminal device in the target cell. As shown in the following description, this embodiment of this application may further include the following steps.

S604*b*: The first radio access network device sends the first information to the second radio access network device.

S605*b*: The second radio access network device receives the first information sent by the first radio access network device.

According to a protocol specification, after receiving the first information sent by the first radio access network device, the second radio access network device may determine that the second radio access network device does not need to allocate the random access resource to the first terminal device in the target cell.

Optionally, the first radio access network device may further send a target cell identifier and an identifier of the first terminal device to the second radio access network device. For example, after S604*a* or S604*b*, S606 and S607 may be performed.

S606: The first radio access network device sends the identifier of the first terminal device to the second radio access network device. It should be noted that S606 may be performed together with S604*a* or S604*b*. To be specific, the first radio access network device sends the second information and the identifier of the first terminal device, or the first radio access network device sends the first information and the identifier of the first terminal device.

S607: The second radio access network device receives the identifier of the first terminal device sent by the first radio access network device.

It should be noted that the first radio access network device may send the identifier of the first terminal device and the first information or the second information to the second radio access network device by using a handover request message in a handover procedure; or the first radio access network device may send the identifier of the first terminal device and the first information or the second information to the second radio access network device by using a secondary base station addition request message (SeNB/SgNB addition request). This is not limited in this application. Certainly, the first radio access network device may further determine the target cell identifier and send the target cell identifier to the second radio access network device, or the target cell identifier may be determined by the second radio access network device. For specific description, refer to S303.

According to the relay communication method provided in this embodiment of this application, when the first terminal device needs to be connected to the target cell of the second radio access network device, the first radio access network device may determine, based on the indication information indicating that the first terminal device is a terminal device with limited uplink power, whether the uplink from the first terminal device to the first radio access network device is maintained. For example, the first terminal device may maintain, through the second terminal device, an uplink connection to the first radio access network device, and the first radio access network device transmits uplink data of the first terminal device to the second radio access network device. In this way, a remote device can still perform uplink communication with a target radio access network device through a relay device.

Figure 7:
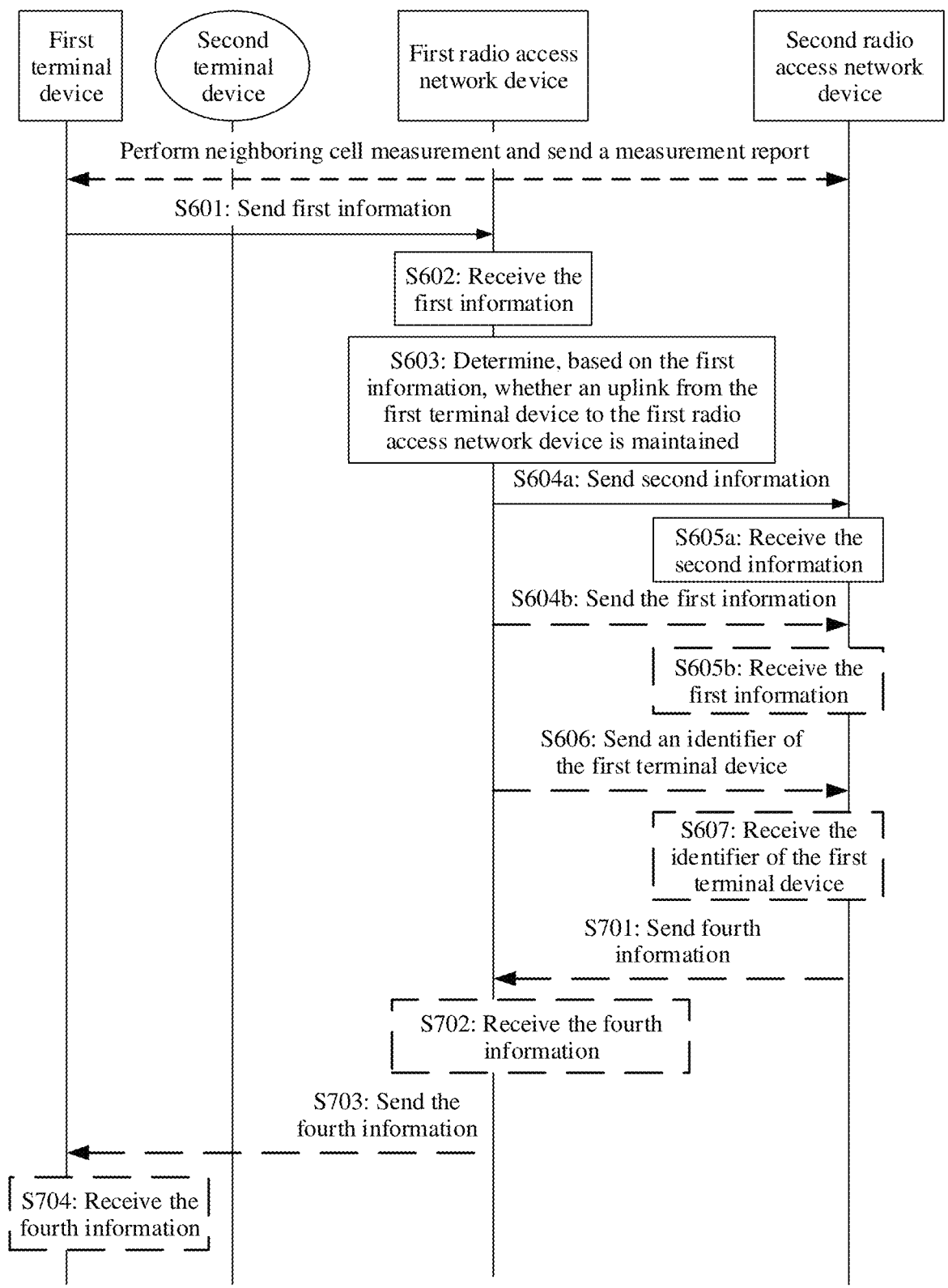
FIG. 7 is yet another example flowchart of a relay communication method according to an embodiment of this application.

Further, after the second radio access network device receives the identifier of the first terminal device, the target cell identifier, the first information, or the second information sent by the first radio access network device, that is, after S605a, S605b, or S607, S701 to S704 may be performed. As shown in FIG. 7, for a specific detailed explanation, refer to the description of S401 to S404.

Figure 8:
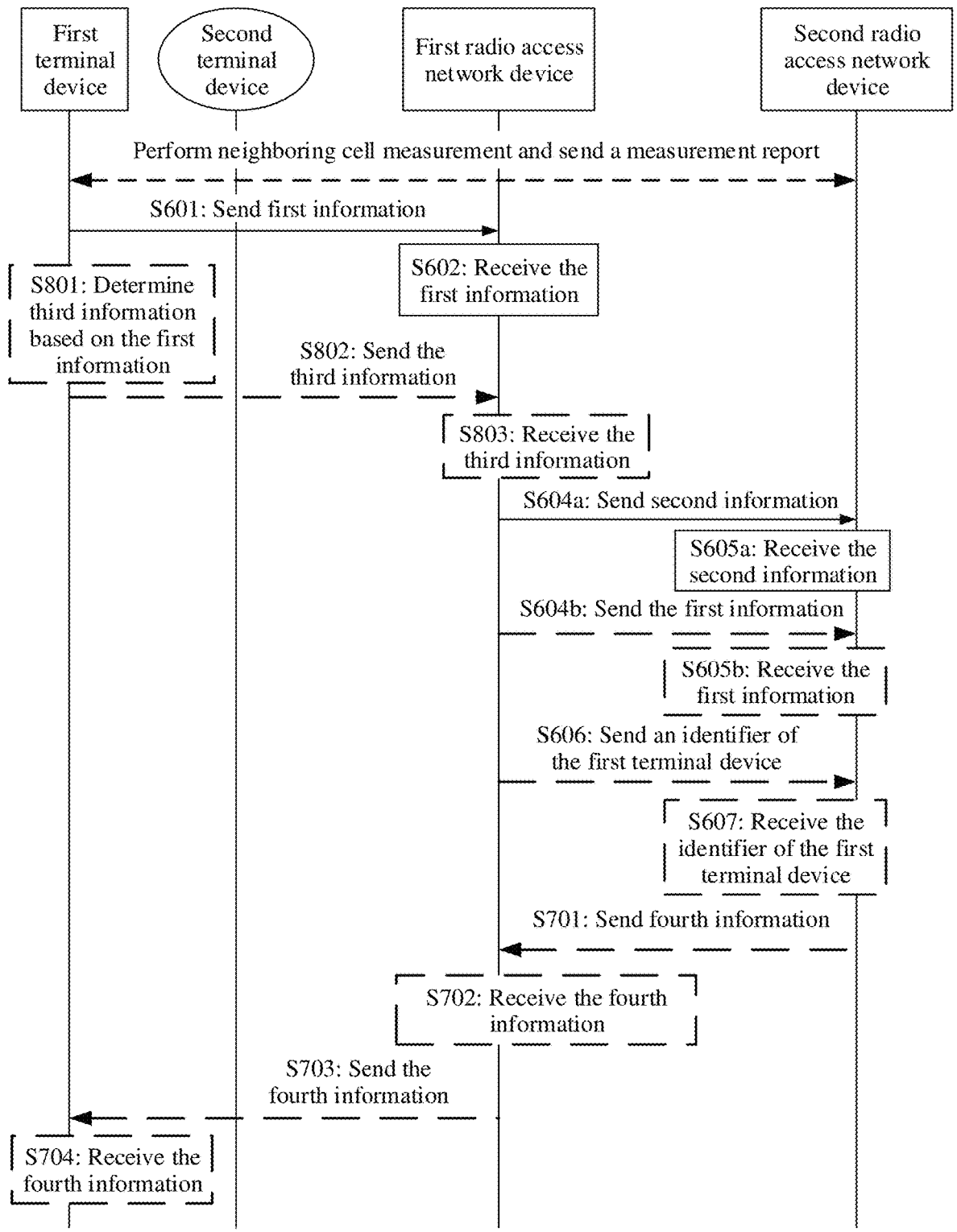
FIG. 8 is yet another example flowchart of a relay communication method according to an embodiment of this application.

Optionally, in a possible implementation, the first radio access network device may not need to determine, based on the first information, whether the uplink from the first terminal device to the first radio access network device is maintained, that is, S603 does not need to be performed. When the first terminal device needs to be connected to the target cell of the second radio access network device, the first terminal device may send the indication information to the first radio access network device, to indicate whether the uplink from the first terminal device to the first radio access network device is maintained. As shown in FIG. 8, this embodiment of this application may further include the following steps.

S801: The first terminal device determines third information based on first information.

The third information is used to indicate whether the uplink from the first terminal device to the first radio access network device is maintained. For example, the first terminal device determines, based on the first information, that the first terminal device is a device with limited uplink power. Then, if the first terminal device determines, based on a measurement result, that no relay device connected to the second radio access network device is found, the first terminal device determines that the uplink from the first terminal device to the first radio access network device is maintained. If the first terminal device determines, based on the measurement result, that the first terminal device finds the relay device connected to the second radio access network device, the first terminal device may determine that the uplink from the first terminal device to the first radio access network device is not maintained, that is, the first terminal device may establish, through the relay device, an uplink to the second radio access network device. The third information may be an uplink maintained (ULMaintained) information element, including two values: true and false. Alternatively, when the third information ULMaintained is included, it indicates that the uplink from the first terminal device to the first radio access network device is maintained; or when the ULMaintained is not included, it indicates that the uplink from the first terminal device to the first radio access network device is not maintained.

S802: The first terminal device sends the third information to the first radio access network device.

It should be noted that the first terminal device may include the third information in an RRC message, and forward the third information to the first radio access network device through the second terminal device. Alternatively, the first terminal device may include the third information in a packet header of a protocol layer, for example, an RLC layer, a MAC layer, a PHY layer, or a newly added adaptation layer of a PC5 interface, between the first terminal device and the second terminal device. After receiving the third information, the second terminal device adds the third information to a Uu protocol layer between the second terminal device and the first radio access network device, and may further carry an identifier of the first terminal device, so that the first radio access network device determines a terminal device that sends the third information.

S803: The first radio access network device receives the third information sent by the first terminal device. S604a or S604b and subsequent steps are performed.

It should be noted that, a physical uplink control channel (PUCCH) includes a scheduling request (SR), a hybrid automatic repeat request acknowledgment (HARQ ACK), a HARQ negative acknowledgment (NACK), and a channel status indicator (CSI). The SR is used to request an uplink resource from the first radio access network device. When the uplink from the first terminal device to the first radio access network device is maintained, after receiving the SR, the first radio access network device does not need to further forward the SR to the second radio access network device. The HARQ ACK or the HARQ NACK is fed back for a downlink. Therefore, the first radio access network device needs to feed back the HARQ ACK or the HARQ NACK to the second radio access network device. In the second implementable manner, when feeding back the HARQ ACK or the HARQ NACK to the first radio access network device, the first terminal device needs to add some information, for example, a HARQ process identifier and a redundancy version (RV) version. The first radio access network device feeds back the identifier of the first terminal device, the HARQ ACK or the HARQ NACK, the HARQ process identifier, the RV version, and the like to the second radio access network device.

Optionally, in addition to searching for the relay device, the first terminal device may further send indication information and the identifier of the first terminal device to the first radio access network device. The indication information is used to indicate that the first terminal device is a terminal device that needs to forward uplink data through the relay device and that directly receives downlink data. The first radio access network device receives the indication information and the identifier of the first terminal device sent by the first terminal device, and sends the indication information and the identifier of the first terminal device to the second radio access network device. After receiving the indication information and the identifier of the first terminal device sent by the first radio access network device, the second radio access network device sends an identifier of the relay device in the coverage area of the second radio access network device to the first radio access network device. After receiving the identifier that is of the relay device in the coverage area of the second radio access network device and that is sent by the second radio access network device, the first radio access network device forwards the identifier to the first terminal device through the second terminal device. After receiving the identifier of the relay device in the coverage area of the second radio access network device, the first terminal device may determine, through searching, that the relay device provides, in the coverage area of the second radio access network device, the relay service for the first terminal device. However, there is also a case in which the first terminal device does not determine the relay device that may provide the relay service for the first terminal device. Subsequently, if the first terminal device still cannot find the relay device provided by the second radio access network device, the first terminal device may determine, with reference to the first implementable manner or the second implementable manner, a relay communication manner. If the first terminal device can find the relay device provided by the second radio access network device, on the uplink of the first terminal device, an RRC connection to the second radio access network device may be established through forwarding by the second terminal device.

Figure 9:
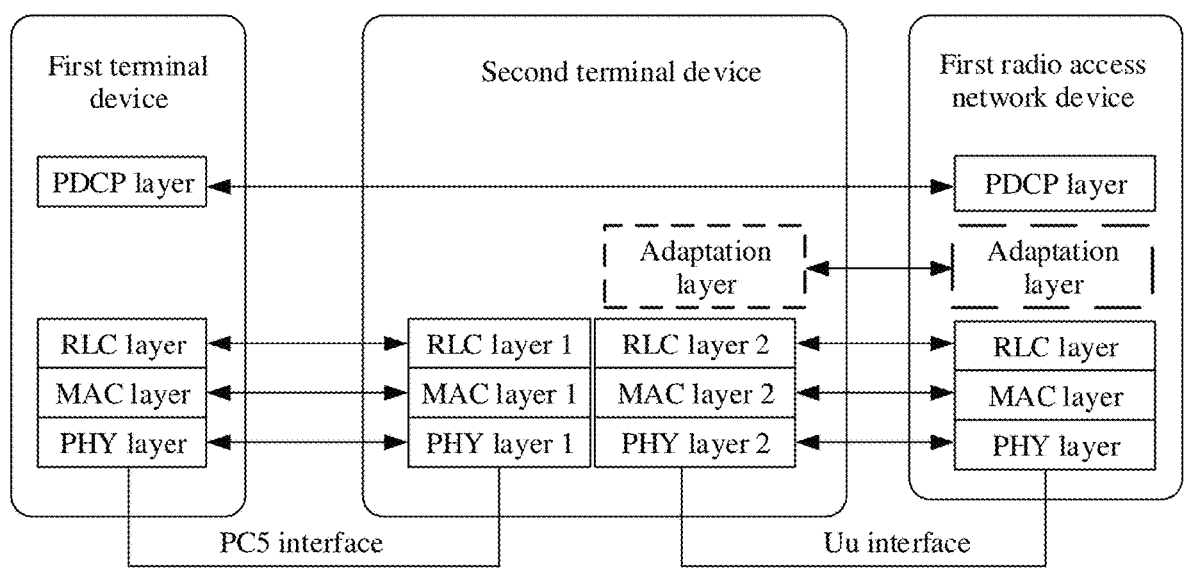
FIG. 9 is an example diagram of a user plane protocol stack according to an embodiment of this application.

For example, a first terminal device communicates with a first radio access network device through a second terminal device. A user plane protocol stack shown in FIG. 9 may be established between the first terminal device, the second terminal device, and the first radio access network device. As shown in FIG. 9, the first terminal device may include a packet data convergence protocol (PDCP) layer, an RLC layer, a MAC layer, and a PHY layer. The second terminal device may include an RLC layer 1, a MAC layer 1, and a PHY layer 1, and may further include an RLC layer 2, a MAC layer 2, and a PHY layer 2. The first radio access network device may include a PDCP layer, an RLC layer, a MAC layer, and a PHY layer. For example, the PDCP layer of the first terminal device is equivalent to the PDCP layer of the first radio access network device, and a wireless communication interface technology, for example, an LTE air interface technology or an NR air interface technology, between the first terminal device and the first radio access network device, is used. The RLC layer, the MAC layer, and the PHY layer of the first terminal device are equivalent to the RLC layer 1, the MAC layer 1, and the PHY layer 1 of the second terminal device. A wireless communication interface technology, for example, an air interface technology of a PC5 interface or a sidelink, between the first terminal device and the second terminal device, is used between these protocol layers. The RLC layer 2, the MAC layer 2, and the PHY layer 2 of the second terminal device are equivalent to the RLC layer, the MAC layer, and the PHY layer of the first radio access network device. A wireless communication interface technology between the second terminal device and the first radio access network device is used between these protocol layers. In addition to these protocol layers, as shown in FIG. 9, each of the second terminal device and the first radio access network device may further include an adaptation layer. For example, the adaptation layer may be a newly added protocol layer in this embodiment of this application. The adaptation layer in the second terminal device is equivalent to the adaptation layer in the first radio access network device. The wireless communication interface technology between the second terminal device and the first radio access network device is used between the two adaptation layers.

PDCP layer: The PDCP layer mainly processes an RRC message from a control plane and an IP packet from a data plane. Functions of the PDCP layer include header compression and decompression, encryption/decryption, integrity protection, transmission of user data and control plane data, reordering, retransmission, and the like.

Adaptation layer: The adaptation layer is mainly responsible for carrying an identifier of the first terminal device, an identifier of a logical channel between the first terminal device and the second terminal device on the sidelink, or a signaling radio bearer identifier or a data radio bearer identifier of the first terminal device.

RLC layer: The RLC layer is mainly responsible for segmenting/concatenating and reassembling RLC service data units (SDU), performing error correction by using an automatic repeat request (ARQ), performing reordering and duplicate packet detection on RLC protocol data units (PDU), re-segmenting RLC PDUs, and the like.

MAC layer: The MAC layer is mainly responsible for matching a logical channel and a transport channel, multiplexing a plurality of MAC SDUs that belong to one or different logical channels to a same MAC PDU, sending the plurality of MAC SDUs to the PHY layer, performing error correction, scheduling processing, logical channel priority processing, scheduling information reporting, random access process processing, and the like by using HARQ.

PHY layer: The PHY layer specifies that mechanical, electrical, functional, and procedural characteristics are provided to create, maintain, and delete a physical link required for data transmission. In brief, the PHY layer ensures that original data can be transmitted over a variety of physical media.

The following briefly describes a process of transmitting data between the first terminal device, the second terminal device, and the first radio access network device.

The first terminal device may further include an application layer, and first data is generated at the application layer. The first data may include a data packet header and payload. After the first data is processed by using the PDCP layer, the RLC layer, the MAC layer, and the PHY layer of the first terminal device, the first terminal device may send the first data to the second terminal device through a first channel between the first terminal device and the second terminal device. The first channel may include one or more logical channels (LCH). Each logical channel corresponds to an identifier. The logical channel identifier may be used to identify the logical channel, and the logical channel identifier may be an index number or the like of the logical channel. For example, it is assumed that the first terminal device is UE 1, the second terminal device is UE 2, and a first channel between the UE 1 and the UE 2 includes five LCs. Identifiers corresponding to the five LCs may be an LCID 1, an LCID 2, an LCID 3, an LCID 4, and an LCID 5.

Optionally, to make first data processed by using the PDCP layer, the RLC layer, the MAC layer, and the PHY layer of the first terminal device suitable to be sent on the first channel, specific formats of protocol stacks of the RLC layer, the MAC layer, and the PHY layer of the first terminal device are specified by using a protocol of a wireless communication interface between the first terminal device and the second terminal device. The first data processed by using the PDCP layer may be referred to as a PDCP protocol data unit (PDU). The first data processed by using the RLC layer may be referred to as an RLC PDU, and the data processed by using the MAC layer may be referred to as a MAC PDU.

The payload included in the first data remains unchanged after the first data is processed by using different protocol layers, but information included in the data packet header may be different after the data packet header is processed by using the different protocol layers. For example, after the first data is processed by using the PDCP layer, the data packet header may include a PDCP sequence number. Subsequently, after the first data is processed by using the MAC layer, the data packet header may further include an LCID, a source address field, a destination address field, and the like in addition to the PDCP sequence number. The source address field may include the identifier of the first terminal device, and the destination address field may include an identifier of the second terminal. For example, the LCID included in the data packet header of the first data may be used to identify a logical channel for transmitting the first data. The identifier of the first terminal device may be used to identify the first terminal device, and the identifier of the second terminal device may be used to identify the second terminal device. In this embodiment of this application, the identifier of the first terminal device may be an identifier of the first terminal device on the first channel, for example, an identifier of the first terminal device on the PC5 interface or the sidelink. The identifier of the second terminal device may be an identifier of the second terminal device on the first channel, for example, an identifier of the second terminal device on the PC5 interface or the sidelink.

As shown in FIG. 9, the PHY layer 1, the MAC layer 1, and the RLC layer 1 of the second terminal device and the PHY layer, the MAC layer, and the RLC layer of the first terminal device are equivalent and are connected in an end-to-end manner. Specifically, for a process in which the first data is processed by using the PHY layer, the MAC layer, the RLC layer, and the PDCP layer that are of the second terminal and that are equivalent to those of the first terminal device, refer to a conventional technology.

When a second channel is not established between the second terminal device and the first radio access network device, the second terminal device may send second data to another relay device through a direct connection channel between the second terminal device and the another relay device (for example, a third terminal device), and the another relay device sends the second data to the first radio access network device. The second channel is a wireless communication interface between the second terminal device and the radio access network device. The second channel may be an LTE-standard air interface (which is referred to as an LTE air interface for short), for example, a Uu interface, or an NR-standard air interface (which is referred to as an NR air interface for short), for example, an Nu interface.

If the second channel is established between the second terminal device and the first radio access network device, the second terminal device may transmit the second data through the second channel established between the second terminal device and the first radio access network device.

In a possible design, the second terminal sends the second data to the first radio access network device through a data radio bearer (DRB) between the second terminal device and the first radio access network device. For example, after processing the second data by using the RLC layer, the MAC layer, and the PHY layer that are of the second terminal and that are equivalent to those of the first radio access network device, the second terminal device may send the second data to the first radio access network device through the data radio bearer between the second terminal device and the first radio access network device. For example, as shown in FIG. 9, the PHY layer 2, the MAC layer 2, and the RLC layer 2 of the second terminal device and the PHY layer, the MAC layer, and the RLC layer of the first radio access network device are equivalent and are connected in the end-to-end manner.

In another possible design, after processing the second data by using the RLC layer, the MAC layer, and the PHY layer that are of the second terminal and that are equivalent to those of the first radio access network device, the second terminal sends the second data to the first radio access network device through a signaling radio bearer (SRB) between the second terminal device and the first radio access network device.

In addition to the existing RLC layer, MAC layer, and PHY layer, a new protocol layer (or referred to as an adaptation layer) may be further added to the first terminal device. The newly added protocol layer is mainly responsible for helping the first radio access network device determine a specific DRB of a terminal device that receives arrival data. For example, a plurality of DRBs of the first terminal device may be transmitted by using one DRB of one second terminal device, or a plurality of DRBs of a plurality of first terminal devices are transmitted by using one DRB of one second terminal device. When the data packet header and the payload are processed by using the newly added protocol layer, the identifier and the DRB identifier of the first terminal device may be included in the second data, for example, included in the adaptation layer packet header. For example, when the data packet header and the payload are processed by using the newly added protocol layer, the identifier of the first terminal device and the identifier of the logical channel between the first terminal device and the second terminal device may be included in the second data, for example, included in the adaptation layer packet header. In this specification, the identifier of the logical channel of the second terminal device may be an identifier of the logical channel of the second terminal device on the sidelink. For example, the newly added protocol layer may be deployed between the PDCP layer and the RLC layer, or deployed between the RLC layer and the MAC layer. This is not limited. Optionally, when the identifier and the DRB identifier of the first terminal device are included in the second data after being processed by using the newly added protocol layer, the second data may further include a newly added protocol layer indication. The newly added protocol layer indication may be included in an RLC PDU, a MAC PDU, or a PHY PDU. For example, the RLC packet header, the MAC packet header, or the PHY layer packet header includes the newly added protocol layer indication, to indicate that the newly added protocol layer exists, so that the first radio access network device determines, based on the newly added protocol layer indication, to deliver the received second data to the newly added protocol layer of the first radio access network device for processing. For example, the newly added protocol layer of the second terminal device is equivalent to the newly added protocol layer of the first radio access network device (that is, there is a correspondence between a newly added protocol layer of a second terminal device and a newly added protocol layer of a first radio access network device).

The first radio access network device may receive, by using the DRB, the second data sent by the second terminal device. After receiving the second data, the first radio access network device may process the received second data by using the PHY layer, the MAC layer, the RLC layer, and the adaptation layer of the first radio access network device, to obtain the identifier and the DRB identifier of the first terminal device. The first radio access network device determines, based on the identifier and the DRB identifier of the first terminal device, that the received data is data sent by using the DRB of the first terminal device, and send the data to a side of the first radio access network device and a PDCP layer corresponding to the DRB of the first terminal device for processing, to obtain the payload. Alternatively, the first radio access network device obtains the identifier of the first terminal device and the identifier of the logical channel between the first terminal device and the second terminal device, then finds the corresponding DRB identifier of the first terminal device based on a mapping relationship that is between the identifier of the logical channel between the first terminal device and the second terminal device and the DRB identifier of the first terminal device and that is stored in the first radio access network device, and sends the data to a side of the first radio access network device and a PDCP layer corresponding to the DRB of the first terminal device for processing, to obtain the payload. For example, in the embodiments of this application, for sending the payload to the PDCP layer of the first radio access network device for processing, refer to a conventional technology.

If the first terminal device or the first radio access network device determines that the second terminal device provides, in a target cell, a relay service for the first terminal device, or the first terminal device may determine that a relay device in a coverage area of the second radio access network device provides a relay service for the first terminal device, the first terminal device may transmit uplink data to the second radio access network device according to a conventional technology with reference to the protocol stack shown in FIG. 9.

If the first terminal device or the first radio access network device determines that an uplink from the first terminal device to the first radio access network device is maintained, the first terminal device communicates with the target cell through the second terminal device, the first radio access network device, and the second radio access network device. A first terminal device may transmit uplink data to a second radio access network device with reference to the protocol stack shown in FIG. 10.

Figure 10:
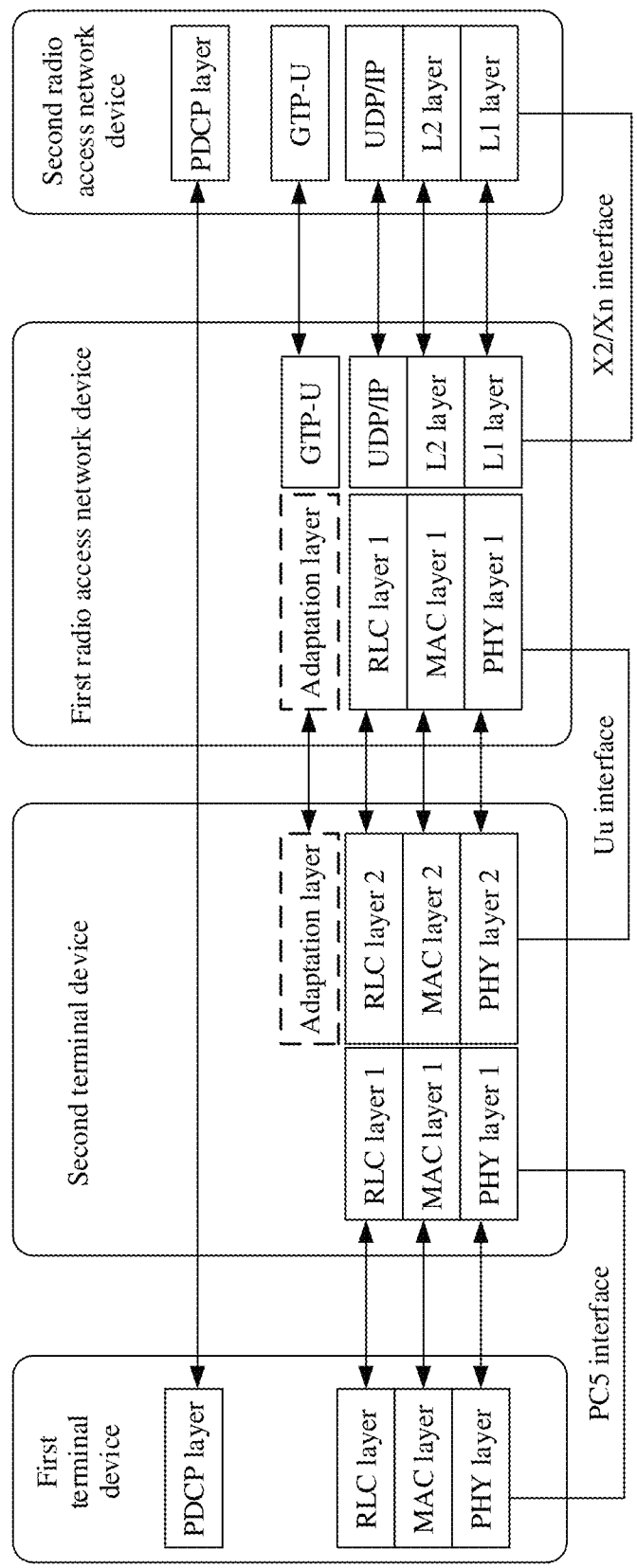
FIG. 10 is another example diagram of a user plane protocol stack according to an embodiment of this application.

For transmission processes of the first terminal device and a second terminal device, refer to the foregoing description. As shown in FIG. 10, a PHY layer 2, a MAC layer 2, an RLC layer 2, and an adaptation layer of the second terminal device and a PHY layer 1, a MAC layer 1, an RLC layer 1 and an adaptation layer of the first radio access network device are equivalent and are connected in an end-to-end manner. A PDCP layer of the first terminal device corresponds to a PDCP layer of the second radio access network device. A wireless communication interface technology, for example, an LTE air interface technology or an NR air interface technology, between the first terminal device and the second radio access network device, is used. The first radio access network device receives second data forwarded by the second terminal device, and obtains an identifier and a DRB identifier of the first terminal device or an identifier of a logical channel between the first terminal device and the second terminal device after the second data is processed by using the adaptation layer. It is assumed that the first radio access network device and the second radio access network device establish a corresponding GTP-U tunnel for each DRB of the first terminal device in advance. In this case, the first radio access network device obtains through processing, the identifier of the first terminal device (for example, an identifier of the first terminal device on a sidelink, or an identifier allocated by the first radio access network device to the first terminal device, for example, a C-RNTI or a local identifier local ID) and the identifier of the logical channel between the first terminal device and the second terminal device on the sidelink from an adaptation layer header. In addition, the first radio access network device obtains a payload sent by the first terminal device, and sends, to the second radio access network device through an interface between the first radio access network device and the second radio access network device. For example, the first radio access network device determines, based on the identifier of the first terminal device, the identifier of the logical channel between the first terminal device and the second terminal device on the sidelink, and a mapping relationship that is between the identifier of the logical channel between the first terminal device and the second terminal device on the sidelink and a data radio bearer DRB of the first terminal and that is stored in the first radio access network device, a DRB identifier that is of the first terminal device and that corresponds to the payload. Alternatively, the first radio access network device obtains through processing, the identifier of the first terminal device and the identifier of the data radio bearer of the first terminal device from the adaptation layer header, to determine a DRB identifier that is of the first terminal device and that corresponds to the payload. Then, the first radio access network device encapsulates the payload into third data, and sends the third data to the second radio access network device through a user plane GTP-U tunnel of an X2 interface or an Xn interface corresponding to the DRB of the first terminal device. As shown in FIG. 10, the first radio access network device may further include an L1 layer, an L2 layer, and a user datagram protocol (UDP)/an IP layer. The second radio access network device may include an L1 layer, an L2 layer, and a UDP/an IP layer. The L1 layer includes the PHY layer, and the L2 layer includes the MAC layer. For example, the L1 layer of the first radio access network device is equivalent to the L1 layer of the second radio access network device. A wireless communication interface technology, for example, a wired interface technology, between the first radio access network device and the second radio access network device, is used. The L2 layer and the UDP/IP layer of the first radio access network device are equivalent to the L2 layer and the UDP/IP layer of the second radio access network device. A wired communication interface technology between the first radio access network device and the second radio access network device is used between these protocol layers. In addition to these protocol layers, as shown in FIG. 10, each of the first radio access network device and the second radio access network device may further include a GTP-U tunnel. The GTP-U tunnel is used by the first radio access network device to transmit the third data to the second radio access network device. When the second data is processed by using the GTP-U tunnel, a GTP-U tunnel endpoint identifier of the first radio access network device and a GTP-U tunnel endpoint identifier of the second radio access network device are added. The third data includes the GTP-U tunnel endpoint identifier of the first radio access network device and/or the GTP-U tunnel endpoint identifier of the second radio access network device. After receiving the third data, the second radio access network device may process the received third data by using the L1 layer, the L2 layer, the UDP/IP layer, and the GTP-U layer of the second radio access network device. The second radio access network device determines the identifier and the DRB identifier of the first terminal device based on the GTP-U tunnel endpoint identifier and a mapping relationship between the GTP-U tunnel endpoint identifier, the first terminal device, and the DRB. Because the PDCP layer includes a plurality of PDCP entities, and each PDCP entity corresponds to one DRB or logical channel, the second radio access network device may send the data to the PDCP layer corresponding to the DRB of the first terminal device and a side of the first radio access network device for processing, to obtain the payload. For example, in the embodiments of this application, for sending the payload to the PDCP layer of the first radio access network device for processing, refer to a conventional technology.

Figure 11:
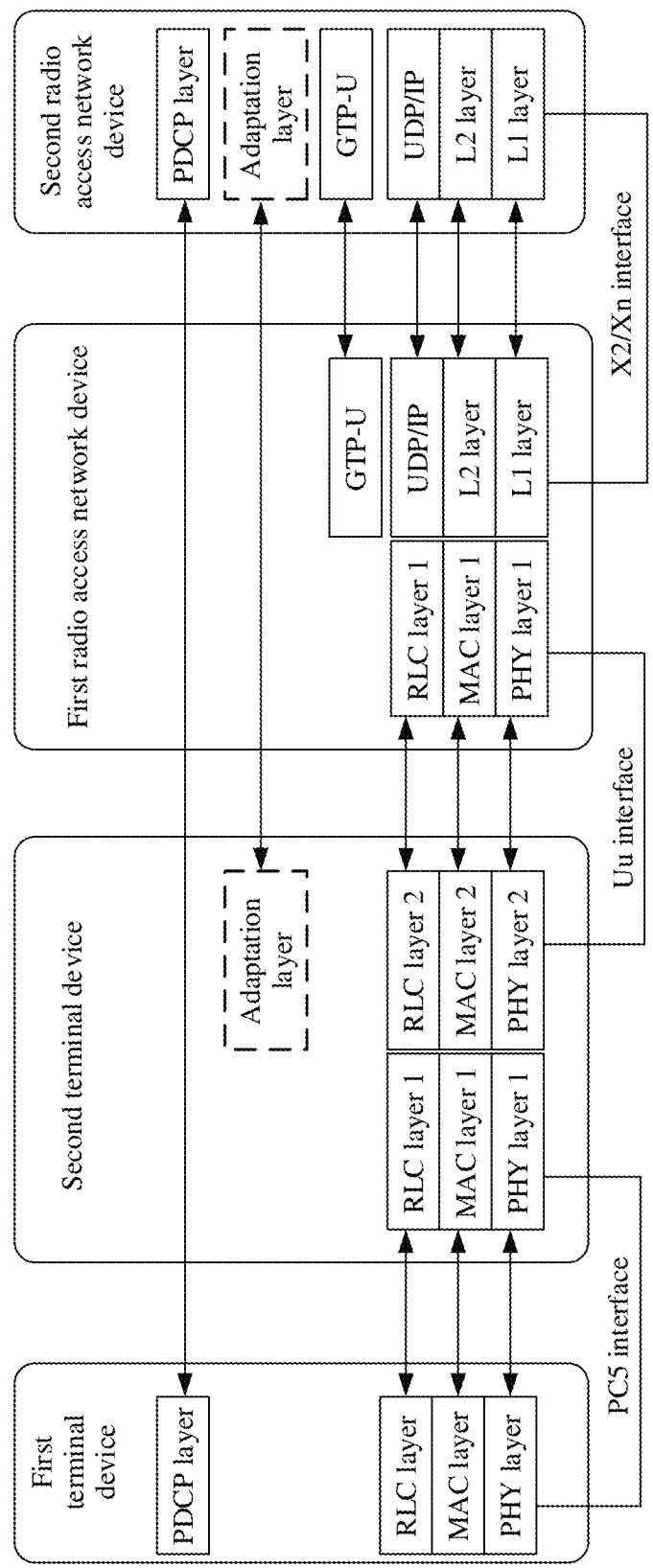
FIG. 11 is still another example diagram of a user plane protocol stack according to an embodiment of this application.

In another possible implementation, as shown in FIG. 11, an adaptation layer may alternatively be separately deployed on a second terminal device and a second radio access network device. After receiving second data, the second radio access network device may process the received second data by using an L1 layer, an L2 layer, a UDP/an IP layer, and a GTP-U layer of the second radio access network device, to obtain an adaptation layer header equivalent to that of the second terminal device and a first payload equivalent to that of a first terminal device. The adaptation layer header includes an identifier of the first terminal device and an identifier of a data radio bearer that is of the first terminal device and that is equivalent to that of the second radio access network device; or the adaptation layer header includes an identifier of the first terminal device and an identifier of a logical channel between the first terminal device and the second terminal device. A PDCP layer includes a plurality of PDCP entities, and each PDCP entity corresponds to one DRB or logical channel. Therefore, the second radio access network device can determine, based on the identifier of the first terminal device and the identifier of the data radio bearer that is of the first terminal device and that is equivalent to that of the second radio access network device, a PDCP layer entity that is of the second radio access network device and that corresponds to the identifier of the data radio bearer of the first terminal device; or determine, based on the identifier of the first terminal device and the identifier of the logical channel between the first terminal device and the second terminal device, a PDCP layer entity that is of the second radio access network device and that corresponds to the identifier of the logical channel of the first terminal device. For example, in the embodiments of this application, for sending the data to the PDCP layer of the second radio access network device for processing, refer to a conventional technology.

Before this, when establishing an X2 or Xn interface, the first radio access network device and the second radio access network device may establish a GTP-U tunnel dedicated to forwarding user data for a user. For example, the first radio access network device provides a GTP-U tunnel endpoint identifier on a side of the first radio access network device in an X2/Xn setup request message, and the second radio access network device provides a GTP-U tunnel endpoint identifier on a side of the second radio access network device in an X2/Xn setup response message. In this case, the established GTP-U tunnel is based on a granularity of a radio access network device. When providing the GTP-U tunnel endpoint identifiers, the first radio access network device and the second radio access network further provide cell identifiers. In this case, the established GTP-U tunnel is based on a granularity of a cell. When sending a handover request or a secondary base station addition request message to the second radio access network device, the first radio access network device provides the GTP-U tunnel endpoint identifier. When replying a handover request acknowledgment or a secondary base station addition request acknowledgment message to the second radio access network device, the second radio access network device provides the GTP-U tunnel endpoint identifier. In this case, the established GTP-U tunnel is based on a granularity of UE.

In the foregoing embodiments provided in this application, the methods provided in the embodiments of this application are separately described from perspectives of the first terminal device, the first radio access network device, the second radio access network device, and interaction between the first terminal device, the first radio access network device, and the second radio access network device. It may be understood that, to implement the functions in the methods provided in the foregoing embodiments of this application, the network elements such as the first terminal device, the first radio access network device, and the second radio access network device include a corresponding hardware structure and/or software module for performing each function. A person skilled in the art should easily be aware that, in combination with algorithms steps of the examples described in the embodiments disclosed in this specification, this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first terminal device and the first radio access network device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 12:
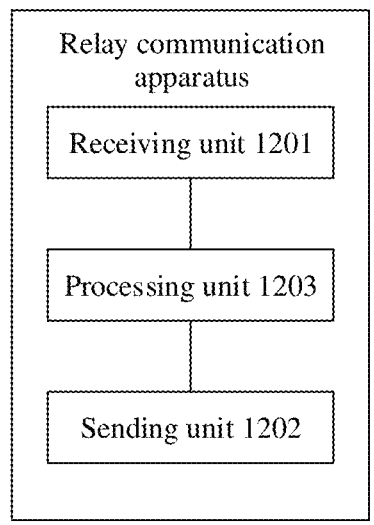
FIG. 12 is an example composition diagram of a relay communication apparatus according to an embodiment of this application.

When each function module is obtained through division based on each corresponding function, FIG. 12 is a possible schematic composition diagram of the relay communication apparatus in the foregoing embodiments. The relay communication apparatus can perform steps performed by the first radio access network device and the first terminal device in any one of the method embodiments of this application. For example, the relay communication apparatus is the first radio access network device or a communication apparatus that supports the first radio access network device in implementing the method provided in the embodiments. For example, the communication apparatus may be a chip system. As shown in FIG. 12, the relay communication apparatus may include a receiving unit 1201, a sending unit 1202, and a processing unit 1203.

The receiving unit 1201 is configured to support the relay communication apparatus in performing the method described in the embodiments of this application. For example, the receiving unit 1201 is configured to perform or support the relay communication apparatus in performing S302 in the parameter configuration method shown in FIGS. 3, S302 and S402 in the parameter configuration method shown in FIGS. 4, S302, S402, and S503 in the parameter configuration method shown in FIG. 5, S602 in the parameter configuration method shown in FIGS. 6, S602 and S702 in the parameter configuration method shown in FIG. 7, and S602, S702, and S803 in the parameter configuration method shown in FIG. 8.

In this embodiment of this application, further, as shown in FIG. 12, the relay communication apparatus may further include the processing unit 1203.

The processing unit 1203 is configured to perform or support the relay communication apparatus in performing S303 in the parameter configuration method shown in FIG. 3, S303 in the parameter configuration method shown in FIG. 4, S603 in the parameter configuration method shown in FIG. 6, and S603 in the parameter configuration method shown in FIG. 7.

For example, the relay communication apparatus is the first terminal device or a communication apparatus that supports the first terminal device in implementing the method provided in the embodiments. For example, the communication apparatus may be a chip system.

The sending unit 1202 is configured to support the relay communication apparatus in performing the method described in the embodiments of this application. For example, the sending unit 1202 is configured to perform or support the relay communication apparatus in performing S301 in the parameter configuration method shown in FIG. 3, S301 in the parameter configuration method shown in FIG. 4, S301 and S502 in the parameter configuration method shown in FIG. 5, S601 in the parameter configuration method shown in FIG. 6, S601 in the parameter configuration method shown in FIG. 7, and S601 and S802 in the parameter configuration method shown in FIG. 8.

The processing unit 1203 is configured to perform or support the relay communication apparatus in performing S501 in the parameter configuration method shown in FIGS. 5 and S801 in the parameter configuration method shown in FIG. 8.

The receiving unit 1201 is configured to perform or support the relay communication apparatus in performing S404 in the parameter configuration method shown in FIG. 4, S404 in the parameter configuration method shown in FIG. 5, S704 in the parameter configuration method shown in FIG. 7, and S704 in the parameter configuration method shown in FIG. 8.

It should be noted that all related content of the steps in the foregoing method embodiments may be cited in function description of corresponding function modules.

The relay communication apparatus provided in this embodiment of this application is configured to perform the method in any one of the foregoing embodiments, and therefore a same effect can be achieved as that of the method in the foregoing embodiments.

Figure 13:
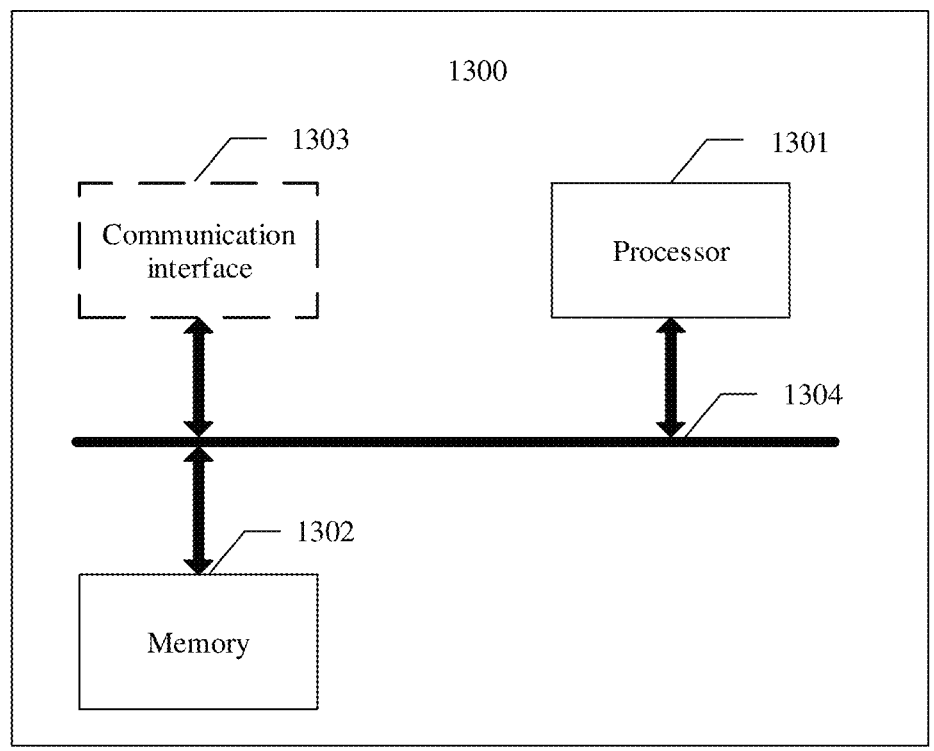
FIG. 13 is an example composition diagram of a communication apparatus according to an embodiment of this application.

FIG. 13 shows a communication apparatus 1300 according to an embodiment of this application. The communication apparatus 1300 is configured to implement functions of the first radio access network device in the foregoing method. The communication apparatus 1300 may be the first radio access network device, or may be an apparatus in the first radio access network device. The communication apparatus 1300 may be a chip system. In this embodiment of this application, the chip system may include a chip, or may include a chip and another discrete component. Alternatively, the communication apparatus 1300 is configured to implement functions of the first terminal device in the foregoing method. The communication apparatus 1300 may be the first terminal device, or may be an apparatus in the first terminal device. The communication apparatus 1300 may be a chip system. In this embodiment of this application, the chip system may include a chip, or may include a chip and another discrete component.

The communication apparatus 1300 includes at least one processor 1301, configured to implement functions of the first radio access network device or the first terminal device in the method provided in the embodiments of this application. For example, if the communication apparatus is the first radio access network device, the processor 1301 may be configured to determine, based on first information, a second terminal device that provides, in a target cell, a relay service for a first terminal device, or determine, based on first information, whether an uplink from a first terminal device to the first radio access network device is maintained. If the communication apparatus is the first terminal device, the processor 1301 may be configured to determine second information based on first information. The second information is used to indicate a second terminal device that provides, in a target cell, a relay service for the first terminal device, or the second information is used to indicate whether an uplink from the first terminal device to a first radio access network device is maintained. For details, refer to detailed description in the method example.

The communication apparatus 1300 may further include at least one memory 1302, configured to store program instructions and/or data. The memory 1302 is coupled to the processor 1301. Coupling in this embodiment of this application may be indirect coupling or a communication connection between apparatuses, units, or modules in an electrical form, a mechanical form, or another form, and is used for information exchange between the apparatuses, the units, or the modules. The processor 1301 may cooperate with the memory 1302. The processor 1301 may execute the program instructions stored in the memory 1302. At least one of the at least one memory may be included in the processor.

The communication apparatus 1300 may further include a communication interface 1303, configured to communicate with another device through a transmission medium, so that an apparatus in the communication apparatus 1300 can communicate with the another device. For example, the communication apparatus is a network device, and the another device is a terminal device. For another example, the communication apparatus is a terminal device, and the another device is a network device. The processor 1301 sends and receives data through the communication interface 1303, and is configured to implement the method performed by the first radio access network device or the first terminal device in the embodiments corresponding to FIG. 3 to FIG. 8.

A specific connection medium between the communication interface 1303, the processor 1301, and the memory 1302 is not limited in this embodiment of this application. In this embodiment of this application, in FIG. 13, the communication interface 1303, the processor 1301, and the memory 1302 are connected through a bus 1304. The bus is represented by using a thick line in FIG. 13. A connection manner between other components is merely an example for description, and constitutes no limitation. The bus may be classified into an address bus, a data bus, a control bus, and the like. For ease of representation, only one thick line is used to represent the bus in FIG. 13, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed and completed by a hardware processor, or may be performed and completed by a combination of hardware in the processor and a software module.

In this embodiment of this application, the memory may be a non-volatile memory, a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store program instructions and/or data.

The foregoing description about the implementations allows a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may be or may not be physically separate, and components displayed as units may be one or more physical units, that is, may be located in one place, or may be distributed on a plurality of different places. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

All or a part of the foregoing method in the embodiments of this application may be implemented by using software, hardware, firmware, or any combination thereof. When software is used to implement the method, all or a part of the method may be implemented in a form of a computer program product. The computer program product includes one or more computer instructions. When the computer program instructions are loaded and executed on a computer, all or some of the procedures or the functions according to the embodiments of the present technology are generated. The computer may be a general-purpose computer, a special-purpose computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

What is claimed is:

1. A relay communication method applied to a unidirectional relay scenario, where in the unidirectional relay scenario, an uplink includes a physical channel from a remote terminal device to a relay device and a physical channel from the relay device to a radio access network device, a downlink includes a physical channel from the radio access network device to the remote terminal device, and the method comprising:

receiving, by a first radio access network device, first information sent by a first terminal device, wherein the first information indicates that the first terminal device has limited uplink power;

determining, by the first radio access network device, based on the first information, a second terminal device that provides, in a target cell, a relay service for the first terminal device; and sending, by the first radio access network device, second information to a second radio access network device, wherein the second information indicates the second terminal device that provides, in the target cell, the relay service for the first terminal device, the second radio access network device belongs to the target cell, and the first terminal device requires connection to the target cell, wherein the method further comprises:

receiving, by the first radio access network device, third information and fourth information sent by the second radio access network device, wherein the third information includes a target cell identifier and a first cell radio network temporary identifier (C-RNTI) allocated to the first terminal device, and the fourth information includes the target cell identifier, a second C-RNTI allocated to the second terminal device, and a random access resource;

sending, by the first radio access network device, the third information to the first terminal device; and sending, by the first radio access network device, the fourth information to the second terminal device.

2. The method according to claim 1, further comprising:
receiving, by the first radio access network device, fifth information sent by the first terminal device, wherein the fifth information indicates the second terminal device that provides, in the target cell, the relay service for the first terminal device.

3. The method according to claim 1, wherein
the second information comprises an identifier of the first terminal device and an identifier of the second terminal device, or
the second information comprises the identifier of the second terminal device.

4. The method according to claim 1, wherein the second information comprises fifth information indicating that the second terminal device provides, in the target cell, the relay service for the first terminal device.

5. The method according to claim 1, wherein the third information and the fourth information are contained in a same interface message sent by the second radio access network device to the first radio access network device.

6. The method according to claim 1, wherein
the first radio access network device receives the first information and a measurement report sent by the first terminal device, and
the first radio access network device determines, based on the first information and the measurement report, the second terminal device.

7. An apparatus, comprising:
a processor; and
a memory storing instructions that, when executed by the processor, cause the apparatus to:
receive first information sent by a first terminal device, wherein the first information indicates that the first terminal device has limited uplink power;
determine, based on the first information, a second terminal device that provides, in a target cell, a relay service for the first terminal device; and
send second information to a first radio access network device, wherein
the second information indicates the second terminal device that provides, in the target cell, the relay service for the first terminal device,
the first radio access network device belongs to the target cell, and
the first terminal device requires connection to the target cell, wherein
the apparatus is further caused to:
receive third information and fourth information sent by the first radio access network device, wherein
the third information includes a target cell identifier and a first cell radio network temporary identifier (C-RNTI) allocated to the first terminal device, and
the fourth information includes the target cell identifier, a second C-RNTI allocated to the second terminal device, and a random access resource; and
send the third information to the first terminal device; and
send the fourth information to the second terminal device.

8. The apparatus according to claim 7, wherein the apparatus is further caused to:
receive fifth information sent by the first terminal device, wherein the fifth information indicates the second terminal device that provides, in the target cell, the relay service for the first terminal device.

9. The apparatus according to claim 7, wherein
the second information comprises an identifier of the first terminal device and an identifier of the second terminal device, or
the second information comprises the identifier of the second terminal device.

10. The apparatus according to claim 7, wherein the second information includes fifth information indicating that the second terminal device provides, in the target cell, the relay service for the first terminal device.

11. The apparatus according to claim 7, wherein the third information and the fourth information are contained in a same interface message sent by the first radio access network device to a second radio access network device.

12. The apparatus according to claim 7, wherein the apparatus is applied to a unidirectional relay scenario, where in the unidirectional relay scenario, an uplink includes a physical channel from a remote terminal device to a relay device and a physical channel from the relay device to a radio access network device, and a downlink includes a physical channel from the radio access network device to the remote terminal device.

13. A non-transitory computer readable storage medium storing computer readable instructions that, when executed by a processor of a computer, cause the computer to provide execution comprising:
receiving first information sent by a first terminal device, wherein the first information indicates that the first terminal device has limited uplink power; and
sending second information to a first radio access network device, wherein
the second information indicates a second terminal device that provides, in a target cell, a relay service for the first terminal device,
the first radio access network device belongs to the target cell, and
the first terminal device requires connection to the target cell, wherein
the computer is further caused to provide execution comprising:
receiving third information and fourth information sent by the first radio access network device, wherein
the third information comprises a target cell identifier and a first cell radio network temporary identifier (C-RNTI) allocated to the first terminal device, and
the fourth information comprises the target cell identifier, a second C-RNTI allocated to the second terminal device, and a random access resource; and
sending the third information to the first terminal device; and
sending the fourth information to the second terminal device.

14. The computer readable storage medium according to claim 13, wherein the computer is further caused to provide execution comprising:
receiving fifth information sent by the first terminal device, wherein the fifth information indicates the second terminal device that provides, in the target cell, the relay service for the first terminal device.

15. The computer readable storage medium according to claim 13, wherein
the second information comprises an identifier of the first terminal device and an identifier of the second terminal device, or the second information comprises the identifier of the second terminal device.

16. The computer readable storage medium according to claim 13, wherein the second information comprises fifth information indicating that the second terminal device provides, in the target cell, the relay service for the first terminal device.

17. The computer readable storage medium according to claim 13, wherein the computer readable instructions are applied to a unidirectional relay scenario, where in the unidirectional relay scenario, an uplink includes a physical channel from a remote terminal device to a relay device and a physical channel from the relay device to a radio access network device, and a downlink includes a physical channel from the radio access network device to the remote terminal device.

18. The computer readable storage medium according to claim 13, wherein the computer is further caused to provide execution comprising:
determining, based on the first information, the second terminal device that provides, in the target cell, the relay service for the first terminal device.

19. The computer readable storage medium according to claim 13, wherein the third information and the fourth information are contained in a same interface message sent by the first radio access network device to a second radio access network device.

* * * * *